(12) United States Patent
Robbins et al.

(10) Patent No.: US 8,855,637 B2
(45) Date of Patent: Oct. 7, 2014

(54) METHODS AND APPARATUS FOR PERFORMING HANDOFF BASED ON THE MOBILITY OF A SUBSCRIBER STATION

(75) Inventors: Barry R. Robbins, San Marcos, CA (US); Todd R. Sutton, Del Mar, CA (US)

(73) Assignee: Wi-Lan, Inc., Ottawa (CA)

( * ) Notice: Subject to any disclaimer, the term of this patent is extended or adjusted under 35 U.S.C. 154(b) by 1584 days.

(21) Appl. No.: 11/689,476

(22) Filed: Mar. 21, 2007

(65) Prior Publication Data

US 2008/0233958 A1 Sep. 25, 2008

(51) Int. Cl.
*H04W 36/00* (2009.01)
*H04W 36/32* (2009.01)
*H04W 88/06* (2009.01)

(52) U.S. Cl.
CPC .............. *H04W 36/32* (2013.01); *H04W 88/06* (2013.01); *H04W 36/0094* (2013.01)
USPC ......... 455/436; 455/441; 455/432.2; 370/338

(58) Field of Classification Search
USPC ............ 455/403, 436–444; 370/338; 709/228
See application file for complete search history.

(56) References Cited

U.S. PATENT DOCUMENTS

| | | | | |
|---|---|---|---|---|
| 5,457,810 A | * | 10/1995 | Ivanov et al. ................ | 455/441 |
| 6,175,735 B1 | * | 1/2001 | Meyer ........................... | 455/440 |
| 6,243,581 B1 | * | 6/2001 | Jawanda ..................... | 455/432.2 |
| 6,501,810 B1 | * | 12/2002 | Karim et al. ................ | 375/369 |
| 7,277,932 B2 | * | 10/2007 | Adachi et al. ................ | 709/220 |
| 7,450,944 B2 | * | 11/2008 | Leelahakriengkrai et al. ........................... | 455/436 |
| 2002/0049058 A1 | * | 4/2002 | Tee ................................ | 455/437 |
| 2002/0102976 A1 | * | 8/2002 | Newbury et al. ............. | 455/436 |
| 2002/0147008 A1 | * | 10/2002 | Kallio ........................... | 455/426 |
| 2004/0068571 A1 | * | 4/2004 | Ahmavaara ................... | 709/228 |
| 2004/0157561 A1 | * | 8/2004 | Akerberg .................. | 455/67.11 |
| 2004/0203998 A1 | | 10/2004 | Knauerhase et al. | |
| 2005/0215241 A1 | | 9/2005 | Okada | |
| 2006/0281404 A1 | * | 12/2006 | Lee et al. ..................... | 455/11.1 |
| 2007/0104140 A1 | * | 5/2007 | Ashish et al. ................. | 370/329 |
| 2007/0123255 A1 | * | 5/2007 | Chae ............................ | 455/434 |
| 2008/0020746 A1 | * | 1/2008 | Alexandar et al. ........... | 455/423 |
| 2008/0045234 A1 | * | 2/2008 | Reed .......................... | 455/456.1 |
| 2008/0181237 A1 | * | 7/2008 | Moon .......................... | 370/400 |
| 2008/0233958 A1 | * | 9/2008 | Robbins et al. .............. | 455/436 |
| 2008/0273607 A1 | * | 11/2008 | Geile et al. .................... | 375/260 |
| 2009/0017823 A1 | * | 1/2009 | Sachs et al. .................. | 455/437 |

FOREIGN PATENT DOCUMENTS

| | | |
|---|---|---|
| WO | 01/45345 | 6/2001 |
| WO | 2004/086681 | 10/2004 |

OTHER PUBLICATIONS

NIST, Time and Frequency from A to Z: F, NIST, 6 pages.*

* cited by examiner

*Primary Examiner* — Mahendra Patel
(74) *Attorney, Agent, or Firm* — Volpe and Koenig, P.C.

(57) ABSTRACT

In a wireless communication system, a mobility factor is used to influence handoff. If a subscriber station has been in a low mobility state for some period of time, the system may handoff operation from a first service type to a second service type. If the mobility factor indicates that the subscriber station is moving, the system may handoff operation from the second service type back to the first service type.

18 Claims, 11 Drawing Sheets

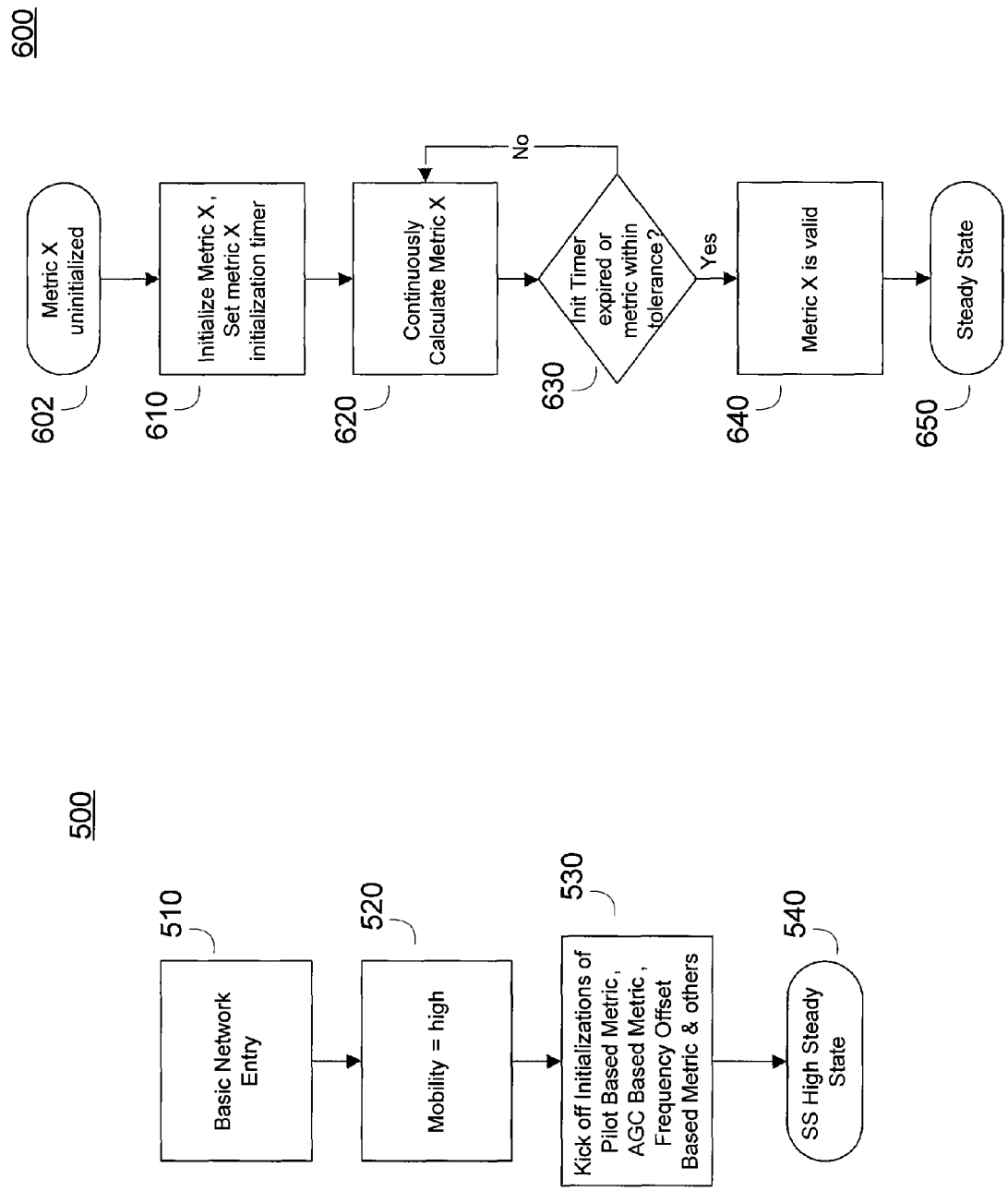

METHODS AND APPARATUS FOR PERFORMING HANDOFF BASED ON THE MOBILITY OF A SUBSCRIBER STATION

BACKGROUND

1. Field of the Invention

The invention concerns methods, apparatus, and systems for handoff in a wireless communication system.

2. Related Art

A subscriber station in a wireless communication system is very often in motion. The motion of the subscriber station introduces variations into a communication channel between the subscriber station and the base station. For example, the motion of the subscriber station introduces a Doppler shift into the communication channel. The subscriber station and the base station can attempt to compensate for the effects of motion of the subscriber station. In this regard, typical wireless communication systems can adjust the transmit frequency in very fine increments to pre-compensate for the effects of Doppler shift in the channel caused by movement of the subscriber station.

A typical communications system can be configured to operate a communications channel with one or more subscriber stations over some predetermined range of operating conditions. The operating conditions can include, for example, conditions for signal power, temperature and signal modulation type.

Typically, a receiver in a communications system is configured to support operations over some predetermined worst case conditions. For example, the receiver can be configured to properly operate without compensation over an entire range of an operating condition, or it can be configured to correct or otherwise compensate for one or more effects of an operating condition when that operating condition is outside of certain range values. For example, the receiver may include a filter whose bandwidth varies based on the temperature. In another example, the receiver can be configured to implement a filter having a fixed bandwidth that is selected to provide sufficient performance over the entire temperature range, or the receiver can be configured to monitor a temperature and to compensate the filter for the effects of temperature.

In the case that the subscriber station is moving, it may be desirable to modify the transmit frequency of the base station and/or the subscriber station based on an estimate of the movement rate of the subscriber station. However, typical methods for estimating the movement rate of the subscriber station in known communication systems are cumbersome and inefficient. In addition, it may be desirable switch an operating parameter of the subscriber station which is related to alternative services based on whether the subscriber station is moving.

BRIEF SUMMARY

Methods and apparatus identify a mobility metric indicative of a level of mobility for a movable subscriber station, and varying or updating one or more operating parameters can be varied or updated based on the mobility metric. A measure of mobility can be determined based on one or a combination of a plurality of factors, such as variations in signal strength, variations in a channel estimate, or variations in phase or frequency of a particular signal or signal component. The one or more measures of mobility can be combined to form a single measure of mobility, the measure of mobility can be quantized into one of a limited number of discrete mobility states, and one or more operating parameters, such as a gain control loop bandwidth, a frequency tracking loop bandwidth, a timing or rate of one or more feedback signals, an observation time, or some other operating parameter can be varied or adjusted based on the mobility state. In addition, the adjusted operating parameter can be a service switch parameter which switches the subscriber station between alternative services based on the mobility state of the subscriber station.

Aspects of the invention include handing off communication in a wireless system by determining a first value of a mobility factor indicative of a relative motion of a subscriber station communicating with a base station using a first service type. The subscriber station determines an availability of an alternative service type if the first value indicates that the subscriber station has been stationary for some period of time. Communications between the subscriber station and the base station is transferred to the alternative service type if it is available.

Aspects of the invention include a method of handoff in a wireless system. The method includes determining a first value of a mobility factor indicative of a relative motion of a subscriber station communicating using a first service type, determining an availability of an alternative service type, and transferring communications to the alternative service type if the first value indicates that the subscriber station has been in a low mobility state for at least a predetermined period of time.

Aspects of the invention include a processor-readable storage medium containing one or more instructions for a processor. The processor executes the one or more instructions to perform the method that includes determining a first value of a mobility factor indicative of a relative motion of a subscriber station communicating using a first service type, determining an availability of an alternative service type, and transferring communications to the alternative service type if the first value indicates that the subscriber station has been in a low mobility state for at least a predetermined period of time.

Aspects of the invention include a subscriber station that includes means for determining a first value of a mobility factor indicative of a relative motion of the subscriber station communicating using a first service type, means for determining an availability of an alternative service type, and means for transferring communications to the alternative service type if the first value indicates that the subscriber station has been in a low mobility state for some period of time.

Aspects of the invention include a base station that includes a monitoring module that determines a mobility factor of a subscriber station serviced over a first service type, a timing module that generates a handoff indication based on the mobility factor when the subscriber station has been in a low mobility state for an extend period of time, and a message generator coupled to the timing module that sends a command to the subscriber station commanding the subscriber station to report an availability of an alternative service type in response to the handoff indication.

Aspects of the invention include a subscriber station that includes a monitoring module that determines a mobility factor indicative of subscriber station motion, a timing module that generates a handoff indication based on the mobility factor when the subscriber station has been in a low mobility state for an extend period of time, a scanner that searches for a second service type and determines the availability of the second service type, and a message generator that requests a handoff to the second service type in response to the handoff indication.

Aspects of the invention include a communication system that includes a base station that offers licensed service and license exempt service, and a subscriber station capable of wirelessly communicating with the base station over both licensed service and license exempt service and that determines to handoff from the licensed service to the license exempt service based in part on a mobility factor.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 5 is a simplified flowchart of an embodiment of a method of initializing a mobility state upon network entry.

FIG. 6 is a simplified flowchart of a method of metric initialization.

DETAILED DESCRIPTION OF EMBODIMENTS OF THE INVENTION

A wireless communication system having one or more base stations can support communications with one or more mobile subscriber stations. The system can determine a mobility factor for each subscriber station and can adjust one or more parameters in a base station, the subscriber station, or both to compensate or otherwise adjust for the mobility. The subscriber station mobility factor can be estimated at the base station, subscriber station, independently at both the base station and subscriber station, or using a combination of the base station and subscriber station.

In one embodiment, the subscriber station or base station can determine the mobility factor, either independently or in combination with the base station, and can communicate the mobility factor to the base station. Conversely, the base station can determine the mobility factor of a subscriber station, independently or in combination with the subscriber station, and can communicate the mobility factor to the corresponding subscriber station.

The subscriber station or base station can determine a mobility factor based on a single metric or multiple metrics.

In embodiments using multiple metrics, each metric can be equally weighted, a subset of metrics can be equally weighted, or each metric can have a distinct weight. The mobility factor can be a value that varies continuously or can be a value that is quantized to a predetermined number of discrete values.

The descriptions contained herein generally focus on Orthogonal Frequency Division Multiple Access (OFDMA) wireless communication systems, and particularly are directed towards IEEE 802.16 wireless communication systems. However, determining a subscriber station mobility factor in an IEEE 802.16 system is described merely as an example. The use of mobility factors and the methods and apparatus for determining a mobility factor of a subscriber station in a wireless communication system can be implemented in virtually any type of wireless communication system.

Figure 1:
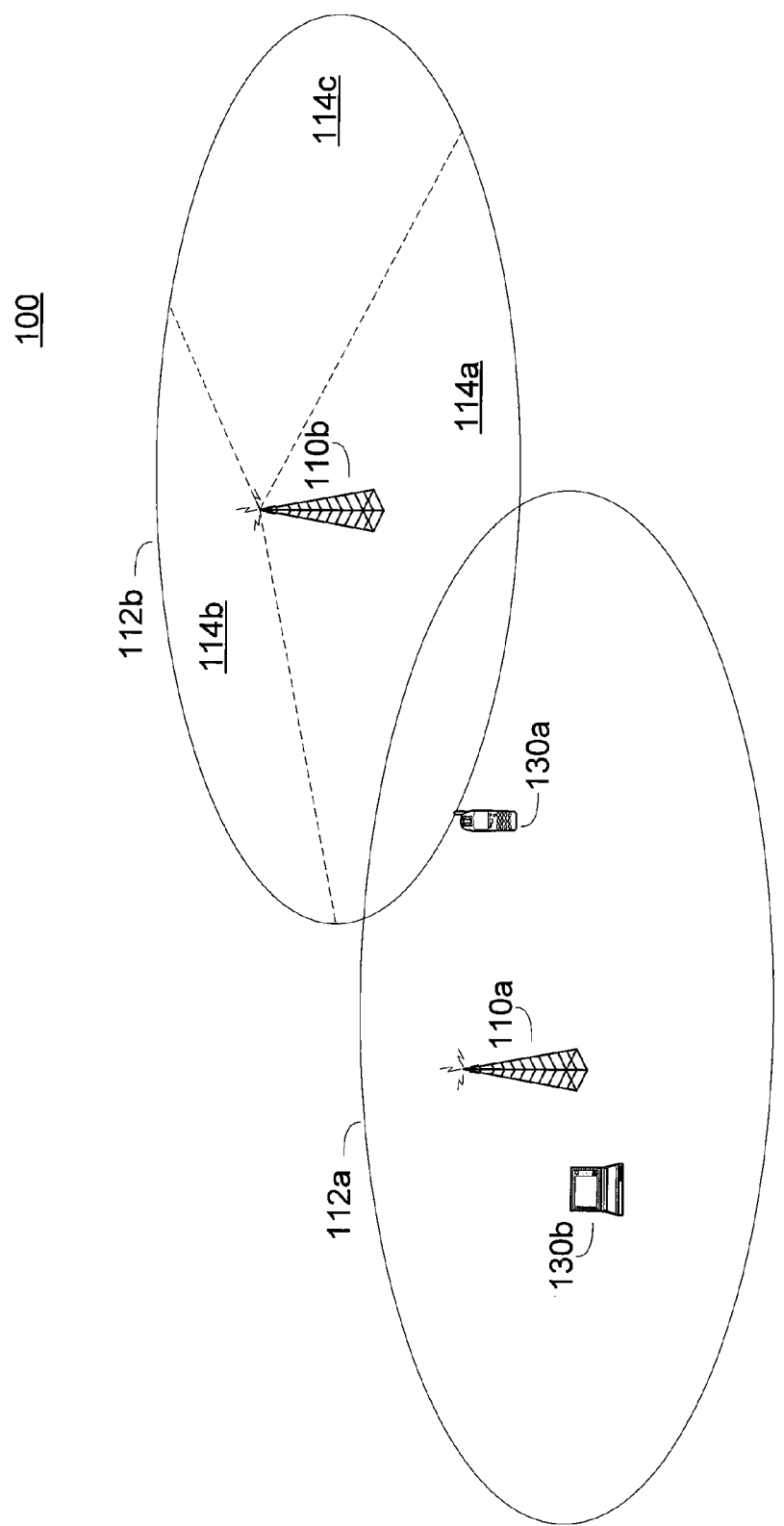
FIG. 1 is a simplified functional block diagram of an embodiment of a wireless communication system.

FIG. 1 is a simplified functional block diagram of an embodiment of a wireless communication system 100. The wireless communication system 100 includes a plurality of base stations 110a, 110b, each supporting a corresponding service or coverage area 112a, 112b. Each base station 110a and 110b can be coupled to a network (not shown) such as a wired network, and can be configured to allow wireless communication with devices on the wired network.

A base station, for example 110a, can communicate with wireless devices within its coverage area 112a. For example, the first base station 110a can wirelessly communicate with a first subscriber station 130a and a second subscriber station 130b within the coverage area 112a. In another example, the first subscriber station 130a can communicate with a remote device (not shown) via the first base station 110a. In another example, the first subscriber station 130a can communicate with the second subscriber station 130b via the first base station 110a.

The base stations, 110a and 110b, can be part of the same communication network or can be part of distinct communications networks. The base stations 110a and 110b can be in communication with each other, either through a direct communication link or via an intermediary network. Alternatively, where the base stations 110a and 110b are in distinct networks, a first base station 110a may have no knowledge regarding the operation of the second base station 110b.

Each of the base stations 110a and 110b can be configured to support an omni-directional coverage area or a sectored coverage area. For example, the second base station 110b is depicted as supporting a sectored coverage area 112b. The coverage area 112b is depicted as having three substantially equal sectors, 114a, 114b, and 114c. The second base station 110b treats each sector, for example 114a, as effectively a distinct coverage area. The number of sectors in each coverage area 112a and 112b is not a limitation on the determination of mobility.

There may be any number of base stations 110a and 110b within a wireless communication system 100, although FIG. 1 depicts only two base stations 110a and 110b. The base stations 110a and 110b alternatively can be referred to as, gateways, access points RF repeaters, frame repeaters, or nodes and are generally any wireless network entry point.

Although only two subscriber stations 130a and 130b are shown in the wireless communication system 100, the system can be configured to support virtually any number of subscriber stations. The subscriber stations 130a and 130b can be mobile stations or stationary stations. The subscriber stations 130a and 130b alternatively can be referred to, for example, as mobile stations, mobile units, or wireless terminals.

A mobile station can be, for example, a wireless handheld device, a vehicle mounted portable device, or a relocatable portable device. A mobile subscriber station can take the form of, for example, a handheld computer, a notebook computer, a wireless telephone, personal media player or some other type of mobile device.

In one example, the wireless communication system 100 is configured for Orthogonal Frequency Division Multiple Access (OFDMA) communications. For example, the wireless communication system 100 can be configured to substantially comply with a standard system specification, such as IEEE 802.16 or some other wireless standard. The wireless communication system 100 can support subscriber stations 130a and 130b whose mobility, and rate of mobility, changes over time. For example, a user may watch a short local news bulletin on his personal media player while riding on a public bus or while wandering around his home. At other times, the user may place his personal media player on his desk and watch a full length feature movie without changing the position of the player. Each of the base stations 110a and 110b or the subscriber stations 130a and 130b can be configured to determine a mobility factor of a corresponding subscriber station, and can adjust one or more operating parameters based on the mobility factor.

The wireless communication system 100 is not limited to an OFDMA system, and determining a subscriber station mobility factor as described herein is not limited to application in OFDMA systems. The description is offered for the purposes of providing a particular example of the operation of determining subscriber station mobility factor in a wireless communication environment.

The base stations 110a and 110b are configured to transmit data packets to the subscriber stations 130a and 130b organized in frames using one or more slots. The term "downlink" is used to refer to the direction of communication from the base station, e.g. 110a, to a subscriber station, e.g. 130a. Each slot can include a predetermined number of Orthogonal Frequency Division Multiplex (OFDM) subcarriers, symbols, or a combination of subcarriers and symbols.

Each base station, for example 110a, can supervise and control the communications within its respective coverage area 112a. Each active subscriber station, for example 130a, registers with the base station 10a upon entry into the coverage area 112a. The subscriber station 130a can notify the base station 110a of its presence upon entry into the coverage area 112a, and the base station 110a can interrogate the subscriber station 130a to determine the capabilities of the subscriber station 130a.

In a packet based wireless communication system 100, it may be advantageous for the system to allocate resources as needed, rather than maintaining an active channel assignment for each subscriber station 130a or 130b having an established communication session with a base station 110a or 110b. The base station 110a can allocate resources to the subscriber station 130a on an as needed basis. For example, in an OFDM system, the base station 110a can allocate time and frequency resources to each subscriber station 130a when the subscriber station 130a has information to send to the base station 110a.

The communication link from the subscriber station 130a to the base station 110a is typically referred to as the "uplink." The base station 110a can allocate uplink resources to the subscriber station 130a to avoid collisions that may occur if the subscriber stations 130a or 130b are allowed random access to the resources. The base station 110a can allocate the uplink resources using one or more slots.

The subscriber stations 130a and 130b can notify the serving base station, for example, 110a, when the subscriber stations 130a and 130b are reporting information to the base station 110a or when the subscriber stations 130a and 130b request uplink resources. Each base station, for example 110a, can allocate some resources to support a random access channel (RAC) used by the subscriber stations 130a and 130b to report information or request resources. The base station 110a can periodically allocate resources to support the random access channel. In one embodiment, the base station 110a can support a random access channel in each uplink frame. For example, a base station 110a can allocate a portion of the uplink to a random access channel. The base station 110a can allocate, for example, a time, duration, and number of OFDM subcarriers on the uplink portion for the random access channel. Each of the random access channel parameters may be static or may be dynamic. The base station 110a can include the random access channel allocation information in a downlink portion that is broadcast across its associated coverage area 112a.

The wireless communication system 100 can also have the ability to modify or otherwise dynamically select other parameters related to the downlink and uplink communication links. For example, each of the base stations 110a and 110b can determine a modulation type and encoding rate from a plurality of modulation types and encoding rates. The base stations 110a and 110b can be configured to select from a predetermined number of modulation types that can include Quadrature Phase Shift Keying (QPSK) and various dimensions of Quadrature Amplitude Modulation (QAM), such as 16-QAM and 64-QAM as well as binary phase shift keying (BPSK.)

Each modulation type can have a limited number of available encoding rates. For example, QPSK modulation can be associated with rate 1/2 or rate 3/4 encoding, 16-QAM can be associated with rate 1/2 or rate 3/4 encoding, and 64-QAM can be associated with rate 1/2, rate 2/3, or rate 3/4 encoding. Thus, a base station 110a, 110b can select a modulation type-encoding rate pair from a possible seven different types.

The base stations 110a and 110b can communicate the modulation type-encoder rate pair to a subscriber station 130a or 130b in an overhead message. In one embodiment, the overhead message can be a broadcast message that includes resource allocation information. For example, the overhead message can include the timing, modulation type-encoder rate pair, and slot information allocated to each of the subscriber stations 130a and 130b in the current frame or one or more subsequent frames. The base stations 110a and 110b can associate particular information with an identifier to allow the receiving subscriber stations 130a and 130b to determine which resources are allocated to them.

The base stations 110a and 110b can transmit the overhead message using a predetermined modulation type and encoder rate, such that the subscriber stations 130a and 130b know, a priori, how to process the overhead message. For example, the base stations 110a and 110b can transmit the overhead messages using the most robust modulation scheme.

Figure 2:
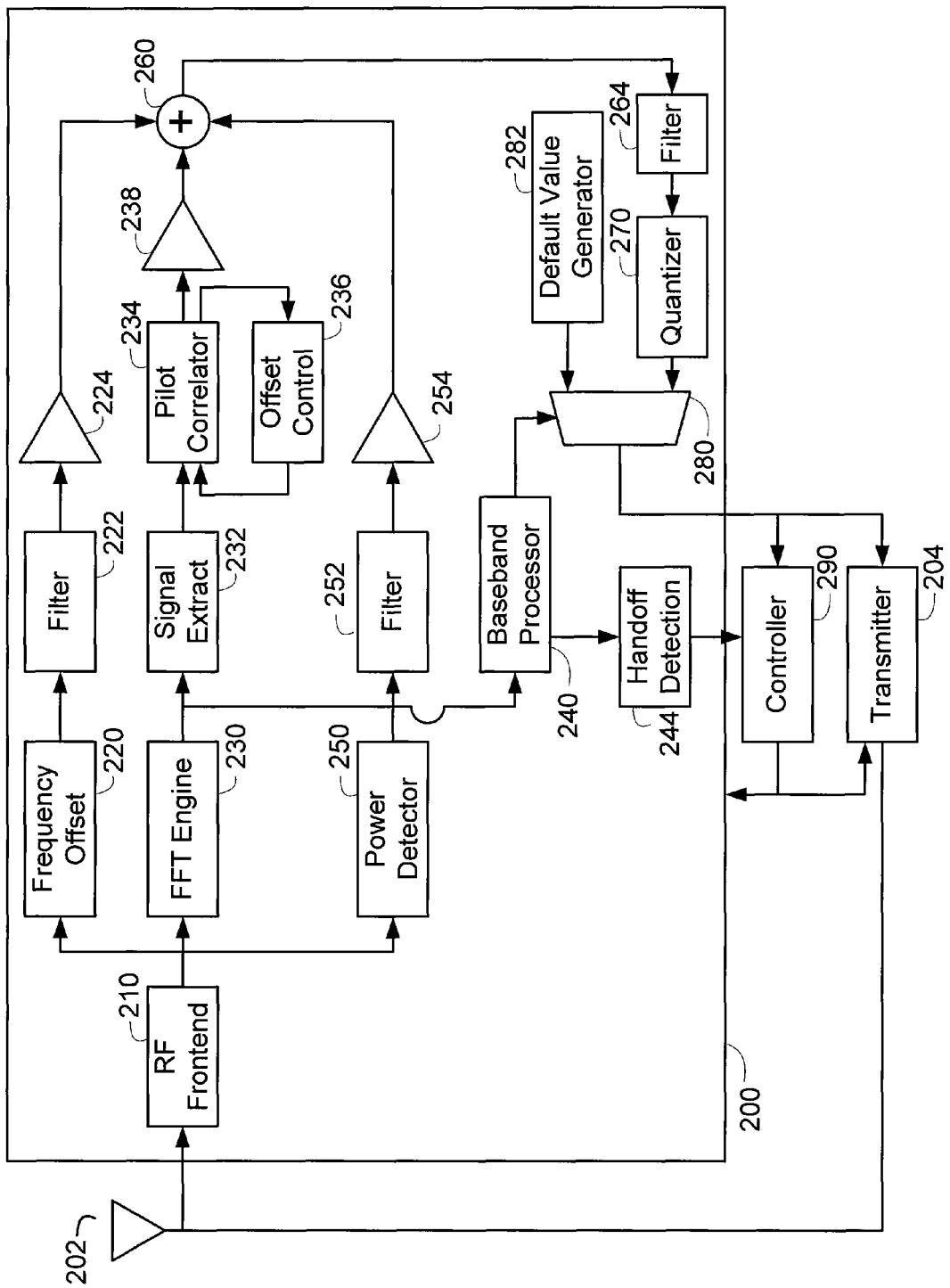
FIG. 2 is a simplified functional block diagram of an embodiment of a receiver configured to generate a mobility factor.

FIG. 2 is a simplified functional block diagram of an embodiment of a receiver 200 configured to generate a mobility factor. The receiver 200 can be, for example, a portion of a transceiver and can be implemented in a mobile station or a base station. The description of FIG. 2 focuses on a receiver 200 embodiment within a subscriber station. The description of a subscriber station receiver 200 is provided merely as an example and does not limit determination of a mobility factor to a subscriber station.

A receiver 200 that is configured to operate in a Time Division Duplex (TDD) communication system, such as an IEEE 802.16 OFDMA wireless communication system, can be selectively activated during a portion of time corresponding to a receive time portion. The receiver 200 can be inactive or otherwise idle during a transmit time portion of a TDD system.

The receiver 200 includes an antenna 202 configured to receive signals from a source, such as a base station. The antenna 202 couples the received signals to a radio frequency (RF) frontend 210, where the received signals are filtered, amplified, and frequency converted to baseband signals.

The receiver 200 embodiment of FIG. 2 determines a mobility factor based at least in part on a combination of three distinct metrics and a receiver state. The three distinct metrics include a metric based on frequency offset trends, a metric based on a correlation of known signals, and a metric based on a variation of a received signal power. The receiver 200 also determines the mobility factor based in part by determining whether the receiver 200 is in a hand-off state.

The receiver 200 determines a mobility factor based on a combination of metrics to accommodate the possibility of different terrain scenarios. For example, in a dense urban terrain, variation of a known signal carried by a channel, such as the pilot signal, may be great even when the subscriber station is stationary. This variation is due to the movement of other objects that affect the wireless channel between the base station and the subscriber station. As an example, a vehicle passing in the vicinity of a subscriber station or individuals walking past a subscriber station may momentarily obscure or otherwise disrupt one or more signal paths to the subscriber station. However, under these conditions, the average energy typically remains fairly constant so long as the subscriber station itself is stationary.

Alternatively, in more suburban terrain in which line of sight channels are more common, average energy may remain relatively stable even when the subscriber station is moving. However, the movement of the subscriber station creates a Doppler shift. Thus, in this case, frequency offset trends created by a Doppler shift can be used to detect motion even when the average energy remains fairly constant.

In order to accommodate multiple possible terrain scenarios, all three metrics are computed and a weighted average is used to compute a final mobility metric. In one embodiment, it may be advantageous if the weighting of one metric is dependent upon the value of another metric. In another embodiment, the receiver 200 determines whether the receiver 200 is presently in a hand-off state. The receiver 200 utilizes the presence of the hand-off state to set a default mobility factor.

The RF frontend 210 couples the baseband signals to a frequency trend metric portion. In the embodiment of FIG. 2, the frequency offset can be determined by examination of frequency changes within a received OFDM symbol or between two different OFDM symbols. For example, frequency changes within a symbol can be determined by examination of changes in the cyclic prefix portion of an OFDM symbol in comparison with the payload data from which the cyclic prefix was determined.

A cyclic prefix is used in a typical OFDM communication system to allow a receiver 200 to compensate for delay spreading of a channel, thereby reducing the effects of inter-symbol interference, as is well known in the art. A typical cyclic prefix is generated by selecting a predetermined number of samples at the end of a symbol and prepending the predetermined number of samples to the beginning of the symbol stream. The cyclic prefix is ideally perfectly correlated with the samples at the end of the symbol. However, changes in the wireless channel, such as due to the movement of the subscriber station, can introduce a frequency offset. Thus, detecting a frequency offset in such a correlation can be indicative of subscriber station mobility.

The frequency offset trend portion can utilize a change in the correlation characteristic of the cyclic prefix to determine a mobility metric. A frequency offset module 220 receives the time domain samples corresponding to a particular symbol and multiplies each complex symbol sample at the end of a symbol with a conjugate of the corresponding complex symbol sample from the cyclic prefix to determine the change in angle or frequency thereof.

In one embodiment, the frequency offset module 220 determines the change in angle using Equation 1:

$$F_m = \angle \sum_{i<m} f_i = \angle \sum_{i<m} \sum_l s[i(T+CP)+l]s*[i(T+CP)+l-T] \quad \text{Eq. 1}$$

In another embodiment, exponential averaging may be used to calculate the accrued phase of the signal, such as, for example, shown in Equation 2:

$$F_m = \angle \tilde{f}_m = \angle(\alpha f_m + (1-\alpha)\tilde{f}_{m-1}) \quad \text{Eq. 2}$$

The functions and variables associated with both Equation 1 and Equation 2 are as follows:
i is an unit-less index;
l is a temporal index in units of samples;
T is the duration of one OFDM symbol, excluding the duration of the cyclic prefix, in units of samples;
s(x) represents time domain signal samples;
s*(x) represents the complex conjugate of s(x);
CP is the duration of the cyclic prefix in units of samples;
$f_i$ is a complex number representation of the autocorrelation of the signal summed over the samples;
$\tilde{f}_i$ is a complex number representation of the autocorrelation of the signal summed over the samples and exponentially averaged over OFDM symbols;
m is a temporal index in units of symbols;
α is a unit-less decay parameter; and
$F_m$ is the phase offset of the signal accrued up to symbol m.

Either Equation 1 or Equation 2 may be used with Equation 3a or Equation 3b to determine the change in frequency as follows:

$$\Delta F(k) = \sum_m |F_m - F_{m+k}| \quad \text{Eq. 3a}$$

$$\Delta F(k) = \sum_m |F_m - F_{m+k}|^2 \quad \text{Eq. 3b}$$

The variables in Equations 3a and 3b are defined as follows:
k is time offset in units of symbols; and
ΔF(k) is the change in phase over k symbols.

The angle of the complex product is proportional to a frequency offset of the received signal relative to a desired receive frequency. Therefore measuring the change in phase is equivalent to measuring the change in frequency.

The frequency offset module 220 couples the resulting complex products to a frequency trend filter 222. The frequency trend filter 222 can be configured to filter the complex products corresponding to a plurality of symbols to determine a moving average of frequency offset across several OFDM symbols and in one embodiment measures the variation over several tens of frames.

In another embodiment, the frequency trend filter 222 can be configured to store a predetermined number of the most recent complex products, corresponding to one or more symbols, and can determine an average of the stored products. The frequency trend filter 222 can output the average to an amplifier 224.

In yet another embodiment, the frequency trend filter 222 can determine an average complex product for each symbol and can store a predetermined number of most recent symbol averages. The frequency trend filter 222 can then determine an average of the predetermined number of most recent symbol averages, and can output this value to the amplifier 224.

In another embodiment, the frequency trend filter 222 determines an average product for a predetermined number of complex products and determines a frequency offset corresponding to the average. The frequency offset can be determined, for example, based on a look up table or based on a characteristic function relating the angle of the complex average to frequency offset. The frequency trend filter 222 can then determine a change in the magnitude of the frequency offset over a predetermined time or number of symbols, samples, or some other increment. Alternatively, the frequency trend filter can determine a difference in magnitude of a value that corresponds to a frequency offset.

The frequency trend filter 222 can couple the magnitude of the frequency offset or a corresponding value to the amplifier 224. The amplifier 224 is configured to amplify or otherwise weight the value from the frequency trend filter 222. The output of the amplifier 224 is coupled to an input of a combiner 260.

The output of the RF front-end 210 is also coupled to a transformation module, here depicted as a Fast Fourier Transform (FFT) engine 230. The FFT engine 230 receives non-redundant samples corresponding to a symbol, and transforms the time domain samples to corresponding frequency domain samples, as well known in the art. For example, each output of the FFT engine 230 corresponds to a subcarrier of the OFDM symbol. The input the FFT engine 230 can include or otherwise couple to a serial to parallel converter in order to interface with a serial stream of complex symbol samples.

The output of the FFT engine 230 is coupled to a signal extraction module 232. The signal extraction module 232 can track or otherwise determine which of the subcarriers correspond to known subcarriers. For example, the signal extraction module 232 can extract subcarriers which represent pilot signals, typically transmitted by the base station spread throughout each symbol. Alternatively or in addition, the signal extraction module 232 can extract subcarriers which represent a preamble, typically transmitted by the base station at the beginning of each frame. Likewise, the signal extraction module 232 can extract subcarriers which represent sounding signals, typically transmitted by the subscriber station no more than once per frame.

Standard OFDMA symbol structures include pilot subcarriers on both the forward link and the reverse link. Rather than carry data, the pilot subcarriers carry a pilot sequence that is known by the receiving station. Often the pilot subcarriers are transmitted at a higher power level and/or lower modulation than the data subcarriers so that they are more easily detected or otherwise acquired by the receiving station. In general, the subscriber stations use the pilot subcarriers to estimate the channel characteristics and to synchronize subscriber station timing to the incoming signal. The base station can use the pilot signals transmitted by the subscriber station in the same manner. Pilot subcarriers are typically spread throughout the OFDM symbol constellation, offset from one another in both frequency and time. In the embodiment shown in FIG. 2, the signal extraction module 232 couples the pilot values to a pilot correlator 234 that determines a mobility metric.

The pilot correlator 234 can be configured to determine a correlation, such as an autocorrelation, cross-correlation or covariance, of pilot signals either within a single symbol or in two distinct symbols. The pilot correlator 234 can include or access memory having stored the pilot values for a plurality of symbols. As will be discussed in further detail below, the offset used in the determination of the correlation, in increments of symbols, can be fixed or can be dynamically determined based in part on the value of the correlation. The pilot correlator 234 can be configured to determine the following correlation metric:

$$R(k) = \left| \sum_{j \in all\ pilots} p(i,j) p^*(i+k,j) \right| \qquad \text{Eq. 4}$$

The functions and variables associated with Equation 4 are as follows:
i is a temporal index in units of symbols;
j is a frequency index in units of subcarriers;
k is a temporal index measured in units of symbols and denotes the temporal offset at which the correlation is made;
p(x,y) denotes the pilot vector stripped out of its modulation and in the frequency domain;
p*(x,y) denotes the complex conjugate of p(x,y); and
R(k) is the correlation metric.

The pilot correlator 234 computes a metric based on a sum of the product of pilots in OFDM symbols i and i+k. The offset value, k, can be fixed or can be adaptively determined.

The pilot correlator 234 can determine the correlation value based on a default offset value, k, or an offset value, k, determined for the most recent covariance calculation. The pilot correlator 234 couples the result to an offset control module 236.

Figure 8:
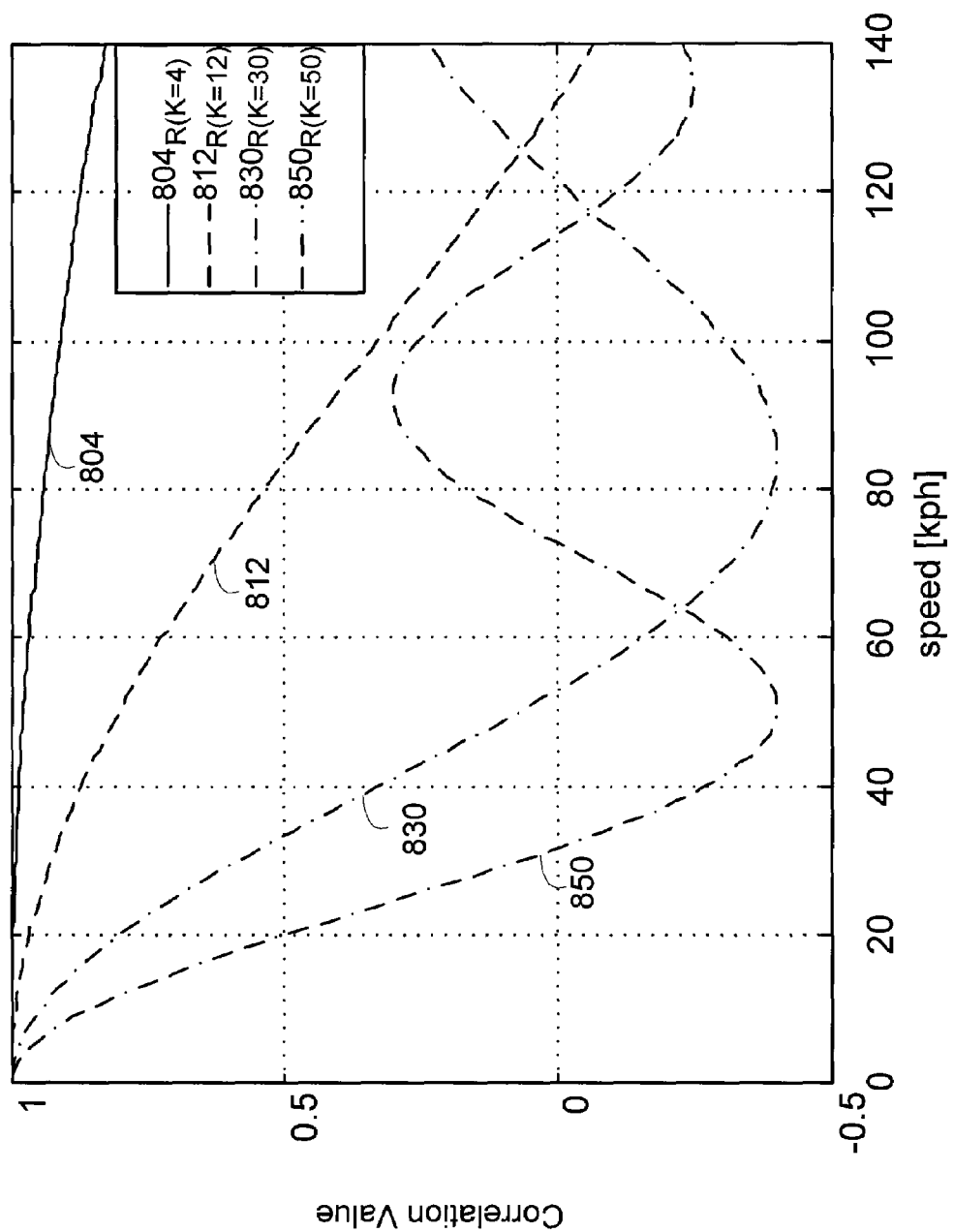
FIG. 8 is a graph of pilot correlation values over velocity for varying symbol offsets.

A plot of the output of an embodiment of the pilot correlator 234 for various offset values, k, is shown in FIG. 8 assuming classical (Jakes) fading. In FIG. 8, the correlation metric R(k) for four different offset values k are plotted. Plots 804, 812, 830, and 850 correspond to k values of 4, 12, 30 and 50, respectively. It can be seen from the curves in FIG. 8 that a tradeoff must be made between choosing various values of k. A relatively small offset value k, e.g. about 12 symbols or lower, may be advantageous in some situations because use of a relatively small offset value k results in lower calculation latency than use of a relatively large offset values k. In addition, the value of k is limited by the frame size. Also, when a relatively small offset value k is used, the correlation metric, R(k), is unique at all practical velocities. Thus, the correlation value can be unambiguously mapped to speed. However, for relatively small offset values k, the value of the correlation metric R(k) is less sensitive to low velocity than at relatively large offset values k. Thus, it can be more difficult to make an accurate prediction of low velocities when using a relatively small offset value.

A relatively large offset value k, e.g. around 50 symbols or more, provides a good estimate for velocities less than approximately 40 kmph. However, the latency associated with determining the correlation is higher and there is a risk that the result is not unique for higher velocities. For example, note that for k=50 the correlation metric R(k) is nearly zero at both about 32 kph and about 72 kph. Thus, in one embodiment, it is advantageous to set the offset value k to a single value. In another embodiment, it is advantageous to change the offset value k over time in response to the current conditions. In one embodiment, the pilot correlator 234 computes correlation metric for several values of k simultaneously.

In an embodiment in which the offset value, k, changes over time, the offset control module 236 can compare the correlation value against one or more predetermined thresholds. The offset control module 236 can adjust the value of the offset or instruct or otherwise control the pilot correlator 234 to adjust the value of the offset. The pilot correlator 234 updates the value of the correlation value and the offset control module 236 continues to adjust the offset value used by the pilot correlator 234 until an acceptable value is reached or a predetermined maximum or minimum offset value is reached.

When a variable offset value is used to determine the correlation, the mobility metric is based in part on the combination of the offset value and the correlation result. In such embodiments, the pilot correlator 234 can be configured to output the correlation value to the offset control module 236 and can determine a distinct mobility metric based on the correlation value and offset value. For example, the pilot correlator 234 can be configured to store a look up table, generator polynomial, characteristic function, or some other manner of determining a value indicative of mobility or velocity based on the correlation value and current offset value, k.

In one embodiment, the offset control module 236 can include a plurality of comparators that are configured to determine a range in which the current correlation value falls. The offset control module 236 can determine a magnitude of a change in the offset value, k, to move the correlation value toward the desired range. The offset control module 236 can, for example, have a look-up table of offset increments or offset values and can update the offset used by the pilot correlator 234 or otherwise instruct the pilot correlator 234 to update the offset value.

For example, the offset control module 236 can write an updated offset value to a register in the pilot correlator 234. In another embodiment, the offset control module 236 can indicate a desire to increment or decrement the offset value and a magnitude of the change using one or more control signals supplied to the pilot correlator 234.

As a specific example, an adaptive algorithm can be used where the pilot correlator 234 initially determines a correlation, for example, R(12) and if the output is very high, say above 0.9, then R(30) is calculated. The offset can be adjusted further until a correlation value around 0.5 is reached. Similarly, the pilot correlator 234 can determine whether the correlation based on the initial offset falls within a predetermined range, e.g. 0.3-0.7. If so, the correlation value and associated mobility based on the correlation value and offset is determined. If not, the offset control module 236 can increase the offset value, for example by a predetermined increment, and the pilot correlator 234 can recompute the correlation. The pilot correlator 234 and offset control module 236 can continue to update the offset value until a limit is reached or the correlation falls within the predetermined range. In communication systems that are packet based, increasing the value of the offset, k, beyond a certain value may require storage of a symbol from a previous packet.

The output of the pilot correlator 234 is also coupled to an amplifier 238 that is configured to scale the correlation value for combination with other mobility metrics. The scale factor used by the amplifier 238 can be set or otherwise varied to achieve a desired weighting of the pilot correlation mobility metric. The output of the amplifier 238 is coupled to an input of the combiner 260.

Sounding signals and preambles also carry known sequences. Although the example above is given using pilot signals, sounding signals or preambles or other known signals may also be used to determine a mobility metric.

For example, a typical OFDMA frame structure may include a sounding zone. The base station can command a subscriber station to periodically transmit a known sequence in the sounding zone over the uplink. The base station uses knowledge of the sounding sequence and the received sounding samples to determine the channel characteristics of the channel between a specific subscriber station and the base station. This information is typically used to provide closed loop antenna steering or other such function. According to the present invention, the base station can use the channel sounding information to determine a mobility metric for a subscriber station in a similar manner as shown above with respect to pilot signals. For example, the base station can correlate sounding samples received from a subscriber station at the end of a first frame with sounding samples received from the subscriber station at the end of a later frame. If the sounding samples are highly correlated, the subscriber station is more likely to be stationary. If the sounding samples are less correlated, the subscriber station is most likely in motion.

Likewise, a typical OFDMA frame structure includes a preamble at the beginning of the downlink portion of each frame. The subscriber station uses knowledge of the preamble and the received preamble samples to synchronize with base station timing. According to the present invention, the subscriber station can use the preamble to determine a mobility metric in a similar manner as shown above with respect to pilot signals. For example, the subscriber station can correlate preamble samples received during a first frame with preamble samples received during a later frame. If the preamble samples are highly correlated, the subscriber station is more likely to be stationary. If the preamble samples are less correlated, the subscriber station is most likely in motion.

The RF front-end 210 couples the baseband signals to a third mobility metric portion configured to determine a mobility metric based on power variation. In a wireless communication system utilizing a relatively wideband signal, a portion of the signal may be affected by a fast signal fade as is well known in the art. In general, a fast signal fade affects only a narrow portion of the band and does not typically affect the entire signal bandwidth. The fast signal fades can be attributable to changes in the channel. Changes in the channel can be attributable to changes in environment due to, for example, changes in the relative position of obstructing or reflecting objects in the signal path. Of course, some times these changes are due to movement of the subscriber station itself. Thus, rapid changes in signal power can be indicative of movement of the subscriber station.

Therefore, the subscriber station can be selectively configured to determine or otherwise indicate mobility based on changes in channel conditions regardless of whether the changes in the channel are due to relative motion, due to motion of one or more objects that affect the channel, or due to some combination thereof. In the case where a change in channel conditions is attributable to motion of objects in the vicinity of the subscriber station, the mobility determined by the subscriber station is an effective mobility.

The receiver 200 can determine a mobility metric by determining an average power of an OFDM symbol, and determining a change over a predetermined time, number of symbols, or number of frames. The RF front-end 210 couples the baseband signals to a power detector 250 that is configured to determine a mobility metric based on an average symbol power.

The power detector 250 can be implemented in any of a variety of ways. For example, the power detector 250 can include a filter and power detector. The filter can have a noise bandwidth approximately equal to a symbol bandwidth. The power detector can be a diode detector or some other wideband detector. Alternatively, the power detector 250 can be implemented digitally, and can include an analog to digital converter or can receive digital symbol samples from the RF front-end 210. The power detector 250 can compute an average symbol power by computing a sum of the squares of each complex symbol sample and determining a magnitude of the sum.

In another embodiment, the receiver 200 can implement an automatic gain control (AGC) loop that is configured to maintain a predetermined range of composite symbol power at the input to the FFT engine 230, as is well known in the art. In such an implementation, the AGC feedback signal controlling the gain in the RF front-end 210 is representative of a symbol power. The AGC feedback control signal can be the mobility metric from the power detector 250.

In one embodiment, the power detector 250 is configured to determine or otherwise compute a power variation according to Equation 5a or Equation 5b.

$$\Delta P(k) = \sum_i |E(i) - E(i-k)| \qquad \text{Eq. 5a}$$

$$\Delta P(k) = \sum_i |E(i) - E(i-k)|^2 \qquad \text{Eq. 5b}$$

The functions and variables associated with Equation 5 are as follows:

i is a temporal index in units of symbols;
k is a temporal index in units of symbols and represents the offset at which the comparison is made.
E(x) represents the average power or average energy during the $x^{th}$ symbol; and
$\Delta P(k)$ is the change in power or energy at an offset of k symbols.

The power detector 250 couples the average symbol power/energy to a filter 252. The filter 252 can be configured to determine a change in the average symbol power over a predetermined period. In one embodiment, the filter 252 is configured to determine a moving average of a change in the average symbol power over a predetermined period.

The filter 252 couples the change in the average power to an amplifier 254 for scaling. The output of the amplifier 254 is coupled to another input of the combiner 260.

The combiner 260 operates to combine the multiple mobility metrics. In the receiver 200 embodiment of FIG. 2, the combiner 260 operates to sum the three weighted mobility metrics to generate a composite mobility metric.

In some embodiments, the receiver 200 can be configured to utilize the composite mobility metric to determine the mobility factor. In the embodiment of FIG. 2, the receiver 200 is configured to generate a discrete mobility factor corresponding to one of a predetermined number of mobility factors.

The combiner 260 couples the composite mobility metric to a quantizer 270 that is configured to convert the composite mobility metric to one of a predetermined number of quantized values. For example, the quantizer 270 can be configured to quantize the composite mobility metric to one of three possible mobility factors. The three mobility factors can loosely correspond to low, moderate, and high mobility. Thus, the quantizer 270 outputs a quantized composite mobility metric corresponding to one of a limited, predetermined number of discrete mobility states.

The combiner 260 can optionally couple the composite mobility metric to a filter 264. The filter 264 can filter the composite mobility metric to smooth the response or otherwise constrain the bandwidth of the composite mobility metric, such that the quantizer 270 does not experience abrupt change sin the composite mobility metric that may be attributable to noise or other transients. The filter 264 can be, for example, a lowpass filter, bandpass filter, and the like, or some other device for smoothing or otherwise limiting the bandwidth of the composite mobility metric. In other embodiments the filter 264 may be eliminated. Alternatively, the filtering process can be combined in one or more of the other functional blocks, such as the combiner 260 or the quantizer 270.

The quantizer 270 can be configured with fixed mobility factor thresholds, dynamic mobility factor thresholds, or some combination of fixed and variable quantization thresholds. For example, the quantizer 270 can be configured with thresholds that introduce hysteresis into the quantized, composite mobility metric transitions. The hysteresis can be introduced by using a different threshold for entering a mobility factor quantization level than is used for exiting the mobility factor quantization level. In one embodiment, the filter 264 can be configured to introduce hysteresis levels and hysteresis timing into the composite mobility metric, such that the mobility factor is not changed unless the composite mobility metric remains within a quantization level for greater than a predetermined time. The quantizer 270 or quantizer 270 in combination with the filter 264 may implement some other processing of the composite mobility metric in order to reduce noise or spurious mobility factor changes.

The quantizer 270 can be implemented a comparator, as multiple comparators, and the like, or some other manner of quantizing the composite mobility metric into a discrete mobility state. The quantizer 270 couples the filtered, quantized, composite mobility metric to an input of a multiplexer 280.

The receiver 200 determines the mobility factor based in part on the mobility metrics as well as a receiver state. The receiver determines its state based, in part, on the communication links to one or more base stations and information received over the one or more communication links.

The receiver 200 also may determine one or more receiver states that are related to mobility, and the one or more receiver states can contribute to the mobility factor. For example, the receiver 200 can determine the presence of a handoff state. A range based handoff occurs when the subscriber station moves out of the coverage area (or range) of a first base station into the coverage area (or range) of a second base station. A handoff state may be active when the subscriber station is preparing to transfer communication from a first base station to a second base station due to a range based handoff, during the range based handoff and for a period of time following the range based handoff. A handoff state may last for an extended period of time if the subscriber station remains in a region supported by the edge of the range of multiple base stations. However, very frequently, when the subscriber station is in a range based handoff state, it is moving.

Thus, the receiver 200 can be configured to substantially or completely override the mobility factor from the quantizer 270 and set the mobility factor to a predetermined value when the receiver 200 is in a handoff state. To determine the presence or absence of a handoff state, the FFT engine 230 couples the OFDM subcarrier information to a baseband processor 240. The baseband processor 240 recovers the underlying information in the subcarriers and determines the receiver state based in part on the recovered information.

For example, a portion of the OFDM subcarriers at a predetermined time may support an overhead channel that is used to communicate handoff information to the subscriber station. The receiver 200 can directly determine the status of a handoff state by examining the overhead information, in a manner well known in the art.

In another embodiment, the baseband processor 240 can include one or more state machines, where each state machine is configured to determine one or more operating states of the receiver 200. For example, a handoff state machine within the baseband processor 240 can be configured to determine, based on the received baseband signals, whether the receiver 200 is presently processing a handoff, or has recently processed a handoff.

The baseband processor 240 can couple the state of the receiver 200 to a control input of a signal selector, such as a multiplexer 280. For example, the baseband processor 240 can generate a single bit control signal that is indicative of the presence or absence of a handoff state.

Alternatively, the baseband processor 240 can couple processed information for one or more channels to a handoff detection module 244. For example, the baseband processor 240 can couple overhead information from one or more overhead channels to the handoff detection module 244. The handoff detection module 244 can determine the presence of a handoff state or condition based on the information from the baseband processor 240. The handoff detection module 244 can be configured to convey the handoff state or condition information to a controller 290, and may selectively control the output of the multiplexer 280.

The multiplexer 280 has the mobility factor from the quantizer coupled to a first input. A default value generator 282 couples one or more predetermined values representative of a mobility factor to a second input of the multiplexer 280. The multiplexer 280 can be configured to select between the mobility factor from the quantizer 270 and the predetermined mobility factor from the default value generator 282 based on the status of the receiver state. For example, the multiplexer 280 can be configured to select the mobility factor from the quantizer 270 when the handoff state is not active and to select the predetermined mobility factor from the default value generator 282 when the handoff state is active, such as, for example, when the subscriber station is in a range based handoff state. The predetermined mobility factor selected from the default value generator 282 can correspond to one of the quantization values and can correspond, for example, to a high mobility factor.

Handoff due to other stimulus may affect the mobility factor differently. For example, a handoff of communications to a wired system is a likely indication that the subscriber station is stationary. As discussed below, the mobility factor can be used to influence a handoff, such as to a license exempt service. In the embodiment discussed below, such a handoff to license exempt service is not indicative of motion.

The receiver 200 can update the mobility factor as often as every symbol or every frame. However, in a typical 802.16e system, each frame is 5 msec in duration and the probability of a significant change in the mobility factor in one frame is small. Moreover, a change in subscriber station mobility is typically limited by physical constraints. Therefore, the receiver 200 may update the mobility factor at a rate that is lower than the frame rate, with little risk of generating an erroneous mobility factor.

The multiplexer 280 can couple the mobility factor to a controller 290 that is configured to control one or more operating parameters based on the mobility factor. The multiplexer 280 can also couple the mobility factor to a transmitter 204. The transmitter 204 can be configured to generate one or more overhead or control messages to inform the base station of the subscriber station mobility factor. The transmitter 204 can be configured to transmit a mobility factor update periodically, upon occurrence of an event, or some combination thereof.

For example, the transmitter 204 can be configured to generate a mobility factor message or messages only when the mobility factor changes. This configuration minimizes the amount of overhead information transmitted. In another embodiment, the transmitter 204 can be configured to transmit a mobility factor message periodically, such as once every predetermined number of symbols or frames. In another embodiment, the transmitter 204 can be configured to transmit a mobility factor message periodically and can be configured to transmit an additional mobility factor message when the mobility factor changes.

The receiver 200 embodiment of FIG. 2 is an example of a receiver 200 configured to determine a mobility factor based on multiple mobility metrics and at least one receiver state. Of course other embodiments may utilize additional or fewer mobility metrics, and may monitor additional receiver states or may choose to omit-state monitoring. In other embodiments, the receiver 200 can be configured to receive a mobility factor from another source, and can be configured to set the value of the mobility factor based on the received value. For example, a subscriber station can receive a mobility factor value from a base station and can configure one or more parameters within the receiver based on the received mobility factor value.

Figure 3:
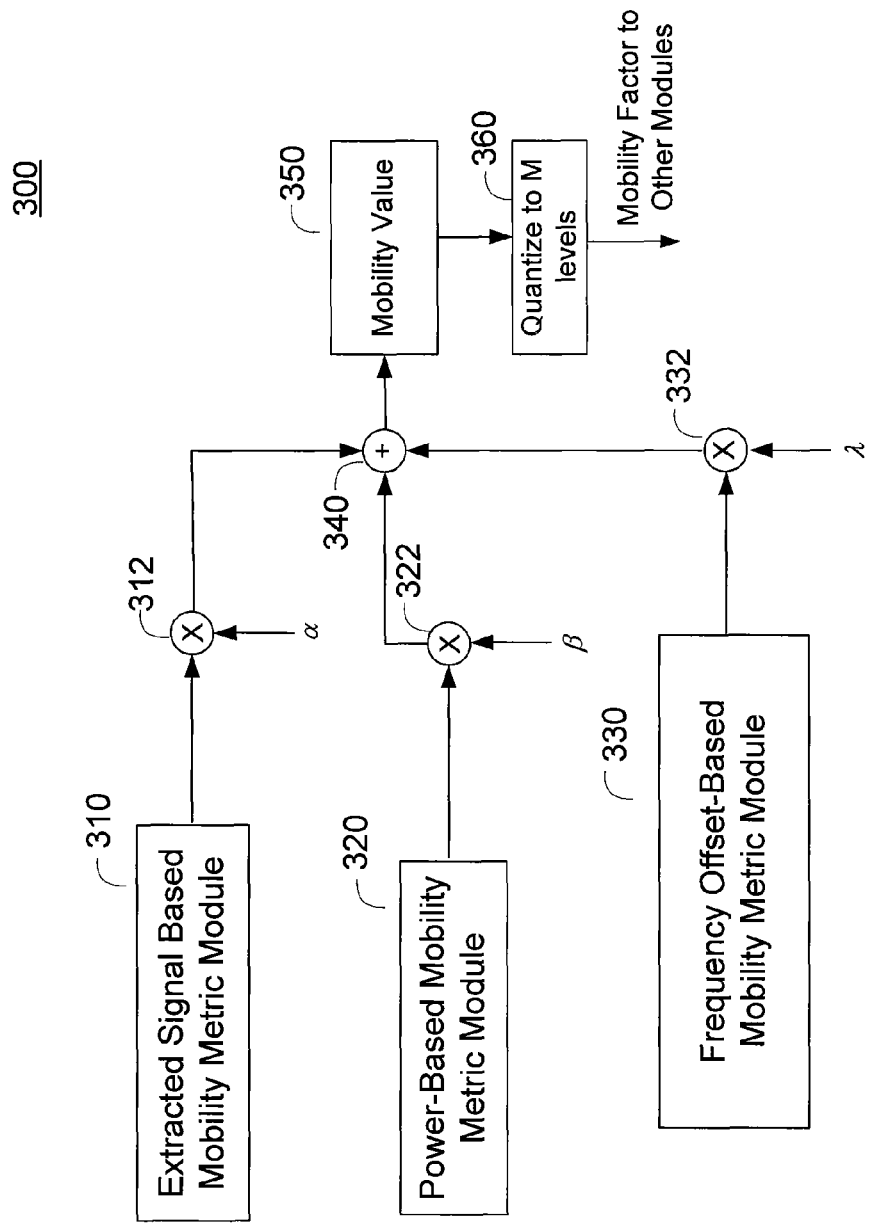
FIG. 3 is simplified functional block diagram of an embodiment of a multi-metric mobility factor generator.

FIG. 3 is a simplified functional block diagram of an embodiment of a multi-metric mobility factor generator 300. The multi-metric mobility factor generator 300 can be implemented within a receiver in a subscriber station or base station of FIG. 1. For example, the multi-metric mobility factor generator 300 is implemented in the various modules of the receiver of FIG. 2.

The multi-metric mobility factor generator 300 includes three distinct mobility metric modules whose mobility metrics are weighted, combined, and quantized. A first mobility metric module is configured to generate a extracted signal based mobility metric and can be configured, for example, to operate as a extracted signal based mobility metric 310. The extracted signal correlator 310 can be configured to determine or otherwise compute the correlation between one or more known signal types over time.

A second mobility metric module is configured to generate a power based mobility metric, and can be configured, for example, to determine a change or variation in a received signal power or energy, either associated with a particular transmitter or based on a composite signal comprised of transmissions from a number of transmitters. The second mobility metric module can be, for example, a power based mobility metric module 320.

A third mobility metric module is configured to generate a frequency offset based mobility metric. A frequency offset based mobility metric module 330 can be configured, for example, to generate a change or variation in a frequency offset value between two distinct symbols or during a single symbol. For example, in one embodiment, the frequency offset based mobility metric module 330 can be configured to determine or otherwise calculate $|\Delta F_m - \Delta F_k|$, where $\Delta F$ represents a frequency offset of a received signal relative to a desired receive frequency, and m and k represent distinct symbol indices.

In another embodiment, the frequency offset based mobility metric module 330 can be configured to determine a frequency offset or variation based, at least in part, on a correlation of a cyclic prefix portion of an OFDM symbol to its redundant copy. For example, frequency offset based mobility module 330 may perform such a calculation according to Equations 1 and 2.

Each of the mobility metrics is individually weighted before being combined. For example, the mobility metric from the extracted signal mobility metric model 310 is weighted by an arbitrary predetermined first weight, α, using a first multiplier 312. Similarly, the mobility metric from the power based mobility metric module 320 is weighted by an arbitrary predetermined second weight, β, using a second multiplier 322. The mobility metric from the frequency offset based mobility metric module 330 is weighted by an arbitrary predetermined third weight, λ, using a third multiplier 332.

The weighted mobility metrics from the first, second, and third multipliers 312, 322, and 332, are coupled to corresponding inputs of a combiner, shown as a signal summer 340. The signal summer 340 may add the weighted mobility metrics directly or it may combine them using a more complex algorithm. The summed composite mobility metric is coupled to a mobility value processor 350 for further processing. The mobility value processor 350 can be configured to filter, amplify, average, or otherwise process the composite mobility metric. Alternatively, as shown in the embodiment of FIG. 2, the mobility value processor 350 may be omitted or its function combined in one or more of the other modules.

The output of the mobility value processor 350 is coupled to a quantizer 360 that is configured to quantize the processed composite mobility metric to one of a predetermined number of quantization levels, or values. For example, the quantizer 360 of FIG. 3 is configured to quantize the mobility metric to one of M distinct levels. The quantized value represents the mobility factor, and can be used by an apparatus, such as a subscriber station or a base station. The mobility factor may also be further processed before use by an apparatus. For example, the computed mobility factor may be compared, modified, or otherwise processed based on a state of an apparatus.

Figure 4:
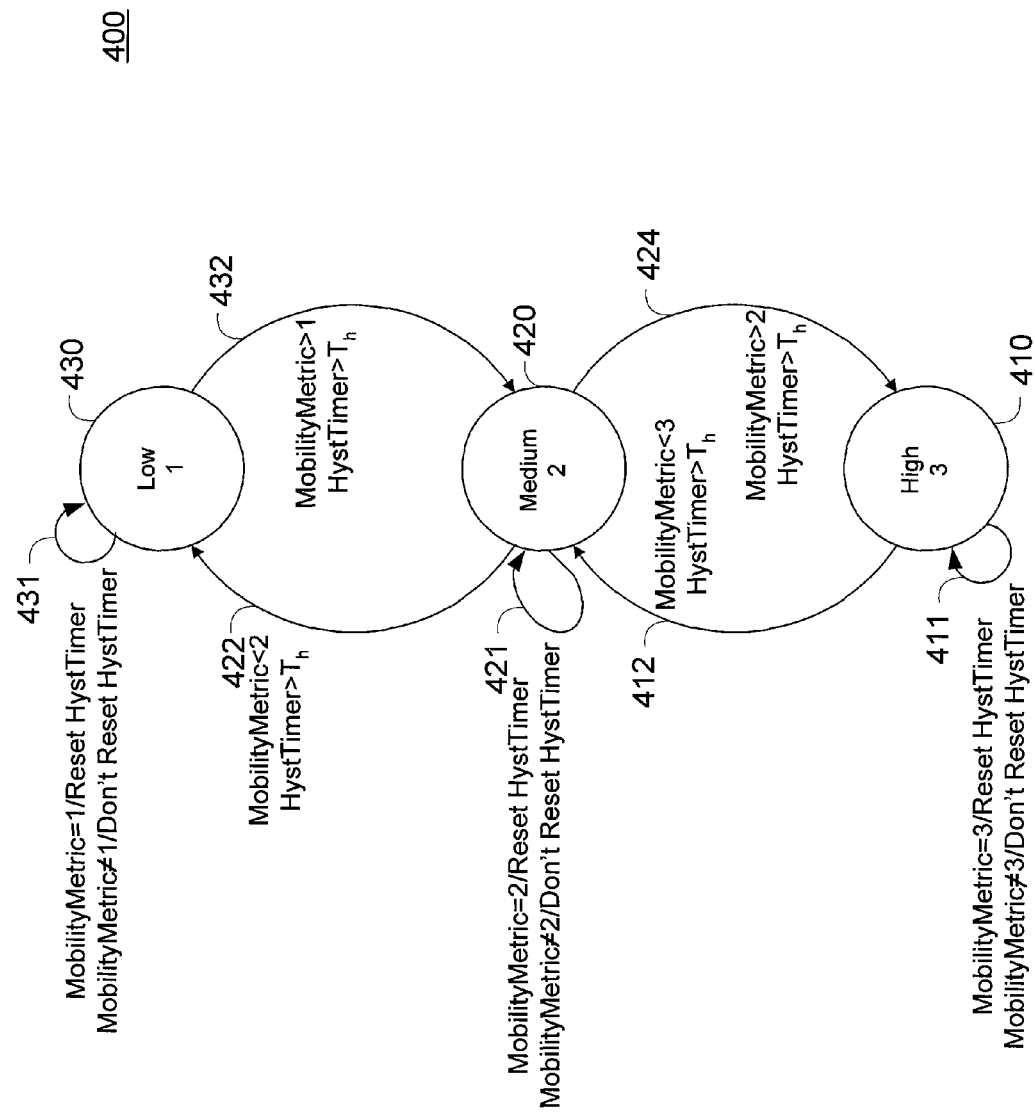
FIG. 4 is an embodiment of a simplified state diagram for transitioning between mobility states.

FIG. 4 is an embodiment of a simplified state diagram 400 for transitioning between mobility states, where each mobility state corresponds to a distinct mobility factor that can be determined based on one or more distinct mobility metrics. The state diagram 400 can be implemented, for example, in the receiver of FIG. 2 or a subscriber station or base station of FIG. 1.

The state diagram 400 illustrates three possible states, corresponding to three possible mobility factor quantization levels. The state diagram 400 begins with the receiver state initialized in the high state 410, corresponding to a high mobility factor.

The receiver continues to monitor the received signals and updates the mobility factor while in each state. If the receiver determines a change in the mobility factor, the receiver initiates a hysteresis timer. The hysteresis timer can be used to prevent spurious state transitions that may be attributable to noise or other transient conditions. The receiver resets the hysteresis timer any time the mobility factor does not indicate a state transition or upon initial entry into a state.

If the receiver determines that the mobility factor is less than the threshold necessary to maintain the high mobility state 410 and has maintained the value for greater than a predetermined hysteresis period, the receiver transitions 412 to the medium mobility state 420. Note that in the state diagram 400 of FIG. 4, the receiver can only transition to adjacent states and does not have the ability to transition directly from the high mobility state 410 to the low mobility state 430. This generally tracks physical limitations, in that a subscriber station cannot transition from high mobility to low mobility without first transitioning to medium mobility.

However, the need to transition through all intermediate states is not a limitation on all mobility state diagrams. In other embodiments, a receiver may transition directly from a low mobility state 430 to a high mobility state 410 without first transitioning to a medium mobility state 420. The state diagram 400 may support bypassing one or more intermediate states in situations where there are numerous closely spaced mobility states, or where the hysteresis time is sufficient to allow bypassing intermediate states.

The receiver performs a similar operation in the medium mobility state 420. The receiver continues to update the mobility factor and allows a hysteresis timer to run if the updated mobility factor does not match the mobility factor corresponding to the medium mobility state 420. If the mobility factor remains below the threshold required to maintain the medium mobility state 420 and maintains the value for greater than the predetermined hysteresis period, the receiver transitions 422 from the medium mobility state 420 to the low mobility state 430. Similarly, if the mobility factor exceeds the threshold required to transition to the high mobility state 410 and maintains the value for greater than the predetermined hysteresis period, the receiver transitions 424 from the medium mobility state 420 to the high mobility state 410.

In the low mobility state 430 the receiver continues to update the mobility factor and allows a hysteresis timer to run if the updated mobility factor does not match the mobility factor corresponding to the low mobility state 430. If the mobility factor exceeds the threshold required to transition to the medium mobility state 420 and maintains the value for greater than the predetermined hysteresis period, the receiver transitions 432 from the low mobility state 430 to the medium mobility state 420.

The receiver need not transition and typically does not transition to a different state on every decision. As shown in the state diagram, the receiver may remain in each of the states following a decision or processing event. The action taken by the receiver when determining that it is to remain in the present state may differ based on the value of the mobility factor.

For example, while in the low mobility state 430, the receiver may determine that the mobility factor is less than the mobility factor needed to transition to another state or can determine that the mobility factor has not exceeded the state transition threshold for longer than the hysteresis period. In such a condition, the receiver maintains the low mobility state 431. If the mobility factor is less than the threshold needed to transition to the next mobility state, the receiver can reset the hysteresis timer. However, if the mobility factor is greater than the threshold needed to transition to the next state, the receiver does not reset the hysteresis timer.

The receiver performs similar actions in each of the other states. When the receiver is in the medium mobility state 420, the receiver can maintain the state 421 if the mobility factor is within the thresholds for the medium mobility state. The receiver resets the hysteresis timer when determining that condition. Alternatively, the receiver can maintain the state

421 if the mobility factor exceeds a transition threshold, but the mobility factor has not exceeded the transition threshold for greater than the hysteresis period. The receiver does not reset the hysteresis timer when determining that condition.

Similarly, when the receiver is in the high mobility state 410, the receiver can maintain the state 411 if the mobility factor remains within the boundaries for a high mobility state. The receiver resets the hysteresis timer when determining that condition. The receiver can maintain the state 411 if the mobility factor exceeds a transition threshold, but the mobility factor has not exceeded the transition threshold for greater than the hysteresis period. The receiver does not reset the hysteresis timer when determining that condition.

FIG. 5 is a simplified flowchart of an embodiment of a method 500 of initializing a mobility factor upon network entry. The method 500 can be implemented, for example, by a receiver of FIG. 2 or a subscriber station of FIG. 1, and is described as being implemented in a subscriber station.

The method 500 begins when a subscriber station initially enters a network. A subscriber station can initially enter a network in a variety of ways, and the manner in which the subscriber station enters the network is not a limitation on the operation of determining and using a mobility factor. For example, a subscriber station can enter a network when it initially powers on in a network coverage area. Additionally, a subscriber station can enter a network by moving from outside a coverage area to a coverage area or by performing a network handoff, in which the subscriber station transitions communications to the desired network.

Upon entry into the network, the subscriber station performs basic network entry processes 510. The basic network entry processes 510 can include, for example, synchronizing to the network, registering with the network, capabilities negotiation, assignment of connection identifiers, and the like.

After executing basic network entry processes 510, the subscriber station proceeds to block 520 and initializes the mobility factor to a default value. The default value can be, for example, a nominal mobility factor value or an extreme value. An extreme default value, such as the highest mobility factor, may be advantageous to allow subscriber station parameters to be initialized in a manner that supports worst case mobility conditions.

After initializing the mobility factor to the default value, the subscriber station proceeds to block 530 and initializes the apparatus and processes related to determining each of the mobility metrics. The subscriber station can determine as few as one mobility metric or may determine multiple mobility metrics. The receiver of FIG. 2 is configured to determine three distinct mobility metrics. The subscriber station implementing the receiver of FIG. 2 would initialize each portion used in determining the distinct mobility metric. For example, the subscriber station initializes determination of the pilot based metric, determination of the symbol power metric, and determination of the frequency offset trend metric. The subscriber station can be configured to initialize each mobility metric process serially, or can be configured to initialize multiple mobility metric processes concurrently.

The subscriber station transitions to steady state operation 540 after initializing each of the mobility metric processes. The subscriber station can communicate over the network and can determine and update the mobility factor once steady state is achieved.

FIG. 6 is a simplified flowchart of a method 600 of metric initialization. The method 600 can be implemented within the network entry method of FIG. 5 and can be executed by a receiver of FIG. 2 or subscriber station of FIG. 1.

The method 600 begins at block 602 with the mobility metric uninitialized. Typically, the mobility metric is uninitialized when the subscriber station is initially powered up or is initially provided access to the network or communication system for which the subscriber station monitors and supports mobility factors.

The subscriber station proceeds to block 610 and initializes the mobility metric to a predetermined value and resets an initialization timer. The predetermined value can be selected based in part on the type of mobility metric being initialized and the anticipated range over which the mobility metric is expected to span.

It may be advantageous to set the mobility metric around a center of an expected range. The moderate initial value may allow the updates to the mobility metric to converge to an empirical value faster than if the mobility metric is initialized to a value at an extreme of the anticipated range.

The initialization timer can be set to a value that ensures the value of the mobility metric is largely determined by the measured values and not by the initial mobility metric setting. For example, where the mobility metric is determined as a moving average and the mobility metric is updated periodically, the initialization timer can be set to a value that ensures that the updated mobility metric will have converged to the actual mobility metric within some predetermined error upon expiration of the initialization timer.

The subscriber station proceeds to block 620 where the subscriber station updates the mobility metric based on the received signals. The subscriber station can continue to update the mobility metric based on the predetermined update schedule. As discussed above, each mobility metric may be updated periodically, upon occurrence of one or more events, or some combination of timing and events.

When the subscriber station is configured to update a mobility metric in a TDD wireless communication system, the subscriber station can restrict updates to the mobility metric to the periods of time dedicated to receiving signals from a base station. That is, the subscriber station does not monitor signals during the transmit portion of a TDD operation. Similarly, where the receive signals to the subscriber station are Time Domain Multiplexed (TDM), the subscriber station can be configured to continue to update the mobility metric for those TDM periods not allocated to the subscriber station, or may restrict mobility metric updating to TDM periods assigned to the subscriber station.

Thus, while a mobility metric may be characterized as updating periodically, e.g. every symbol, in a TDD system, the update period typically refers to the receive period. The mobility factor may not update for substantially the entire portion of the transmit period. Similarly, mobility metrics may utilize information that spans TDD periods or spans multiple data packets or frames and the update may not occur periodically due to time gaps between relevant receive data.

The subscriber station proceeds to decision block 630 after updating the mobility factor. At decision block 630, the subscriber station determines if the initialization timer has expired. If not, the subscriber station returns to block 620 to again process received data and update the mobility factor.

If the subscriber station, at decision block 630 determines that the initialization timer has expired, the subscriber station proceeds to block 640. The subscriber station, at block 640, can indicate that the initialization of the mobility metric is substantially complete, and that the mobility metric is a valid metric derived from received signals. The subscriber station can indicate a valid mobility metric, for example, by setting flag, sending a message, asserting a control line, and the like or some other manner of indicating a valid mobility metric.

The subscriber station proceeds to block 650 and transitions to a steady state condition. The subscriber station can be controlled to initiate other mobility metrics or may be controlled or otherwise directed to perform some other tasks in the steady state condition.

The various mobility metric initialization processes may have different initialization timers and may update at different intervals. Thus, the subscriber station may not assume completion of mobility metric initialization without a positive assertion from each mobility metric process or apparatus. Thus, the subscriber station may monitor multiple flags, bits, or locations and can wait until all mobility metrics have indicated valid values before determining that all mobility metrics have been initialized.

Figure 7:
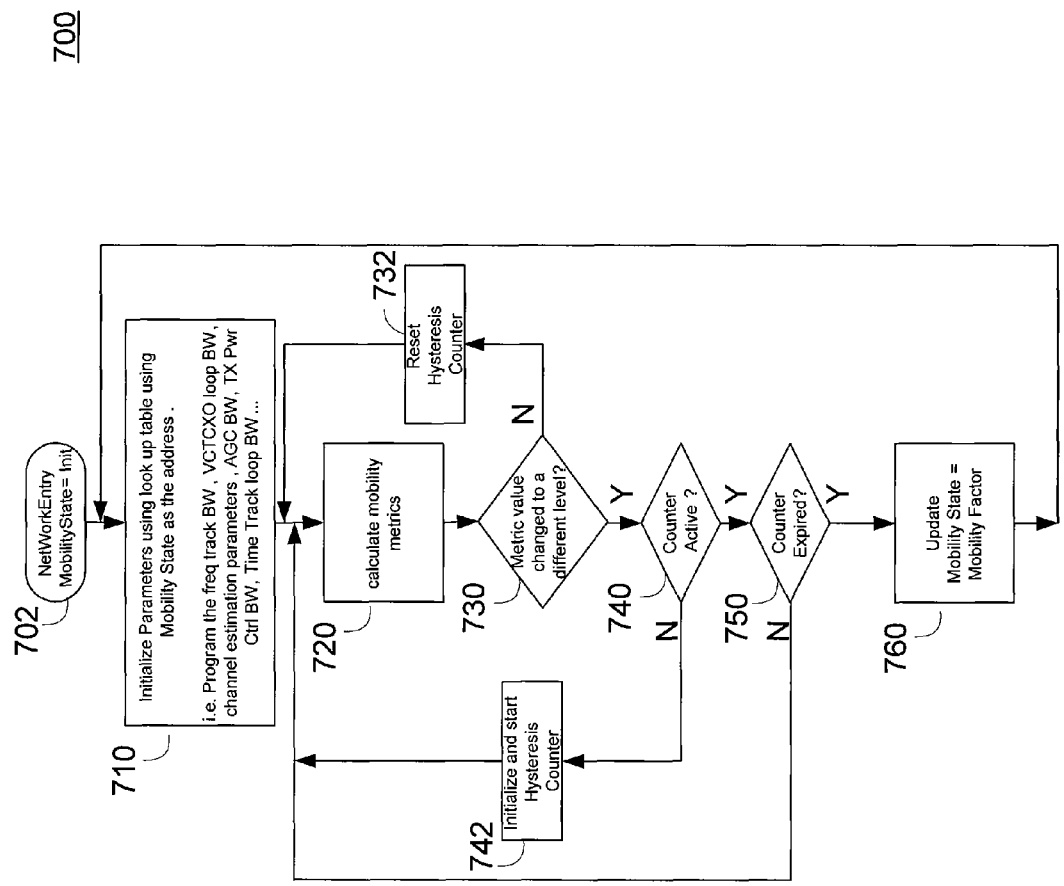
FIG. 7 is a simplified flowchart of an embodiment of a method of modifying parameters based on a mobility state.

FIG. 7 is a simplified flowchart of an embodiment of a method 700 of modifying parameters based on a mobility state. The method 700 can be implemented by a receiver of FIG. 2 or a subscriber station of FIG. 1.

The method 700 begins at block 702 where the mobility factor is set to its initial state, for example, after network entry. The subscriber station proceeds to block 710 and configures the operating parameters that are based, at least in part, on the mobility factor. The subscriber station is configured in the mobility state corresponding to the mobility factor following configuration of the operating parameters.

The subscriber station can configure any number of parameters based on the mobility factor. Examples of operating parameters include, but are not limited to, a frequency tracking bandwidth, a loop bandwidth of a phased lock loop, one or more parameters or processes used in conjunction with channel estimation, a bandwidth of an AGC loop, a bandwidth of a transmit power control loop, a bandwidth of a time tracking loop, and the like, or some other operating parameter.

After setting the operating parameters, the subscriber station proceeds to block 720 and updates the mobility factor. For example, the subscriber station can be configured to update the mobility factor based on one or more mobility metrics and one or more subscriber station operating states.

After updating the mobility factor, the subscriber station proceeds to decision block 730. At decision block 730, the subscriber station determines whether the updated mobility factor is different from the mobility factor corresponding to the present mobility state.

If not, the subscriber station need not make any changes to the operating parameters. The subscriber station proceeds to block 732, where the subscriber station resets or otherwise clears a hysteresis counter or timer. The subscriber station then returns to block 720 to continue updating the mobility factor.

If the subscriber station determines in decision block 730 that the updated mobility factor corresponds to a new mobility state and does not correspond to the present mobility state, the subscriber station proceeds to decision block 740. In decision block 740, the subscriber station determines whether the hysteresis counter is presently active and counting. The hysteresis counter or timer is used to filter the mobility factor, such that the subscriber station does not quickly toggle between two mobility states when the mobility factor is near a threshold. The subscriber station may alternatively implement hysteresis into the thresholds of a mobility factor quantizer.

If the hysteresis counter is not presently active and counting, the subscriber station proceeds from decision block 740 to block 742, where the subscriber station initializes and activates the hysteresis counter. The subscriber station proceeds from block 742 back to block 720 to continue to monitor and update the mobility factor.

If the subscriber station determines that the hysteresis counter is presently active and counting, the subscriber station proceeds from decision block 740 to decision block 750. At decision block 750, the subscriber station determines whether the hysteresis counter has expired. If not, the subscriber station proceeds from decision block 750 back to block 720 where the subscriber station continues to monitor and update the mobility factor.

If, at decision block 750, the subscriber station determines that the hysteresis counter has expired or otherwise indicated a time out, the subscriber station proceeds to block 760. The subscriber station has determined a mobility factor different from mobility factor corresponding to the present mobility state that has been active for longer than the hysteresis time. The subscriber station can thus conclude that the updated mobility factor is not a spurious or otherwise short transient condition. In block 760, the subscriber station updates the active mobility state to correspond to the present mobility factor. The subscriber station then returns to block 710 to adjust or otherwise modify the subscriber station operating parameters to be consistent with the updated mobility state.

As noted above, the subscriber station can be configured to update one or more operating parameters based in part on the mobility factor. The relative mobility of a subscriber station can affect many aspects of a received signal, and the subscriber station can compensate for some of the effects by modifying its operating parameters based on a measure of mobility. For example, the relative velocity of a subscriber station introduces a Doppler shift into the wireless signals received and transmitted by the subscriber station.

The subscriber station can compensate for the effects of Doppler shift, as well as other signal effects by modifying one or more operating parameters. A number of operating parameter examples are provided below. However, the operating parameters discussed are not exclusive, and there may be additional operating parameters that may be adjusted or otherwise varied based on the mobility factor. Additionally, subscriber station can implement a subset of the parameter optimization discussed or may even omit any parameter optimization. The subscriber station can include a look up table having the operating parameters for each mobility factor.

The subscriber station can adjust a loop filter or time constant of an Automatic Gain Control (AGC) loop. A lower mobility can benefit from a longer integration time for AGC and provide a more accurate setting. A higher mobility factor can correspond to a faster update rate or a larger gain control loop bandwidth.

The subscriber station can use an oscillator, such as a Voltage Controlled Temperature Compensated Crystal Oscillator (VCTCXO) as a frequency reference in a frequency synthesizer. The frequency synthesizer can be used as a local oscillator to downconvert, mix, or otherwise frequency convert the RF signals to baseband signals. The loop bandwidth of a frequency synthesizer or phased lock loop used to generate the local oscillator signal can be reduced for low mobility factors. A reduced loop filter bandwidth can contribute to a reduction in noise. In this way, the mobility factor can be used to affect the loop bandwidth of an RF frequency reference or synthesizer or the digitally created equivalent thereof.

In another embodiment, the subscriber station can use a Temperature Controlled Crystal Oscillator (TCXO), and a digitally controlled phase locked loop can control the precise frequency of a frequency reference. For example, a divider ratio in a frequency synthesizer can be varied to control the frequency, and the loop bandwidth associated with the digital control of the divider ratio can be a function of the mobility factor.

In another embodiment, a digitally controlled numeric rotator can be used in a digital domain of the subscriber station to rotate or otherwise compensate for differences between the oscillators in the base station and the subscriber station. The loop bandwidth for the digital control can be a function or otherwise depend on the mobility factor.

In a wireless communication system, the subscriber station may need to adjust its power, timing and frequency offset such that the signal arriving at the base station is substantially orthogonal to signals from all other subscriber stations. The timing and frequency requirements pertain mainly to OFDM or OFDMA based wireless communication systems. A low mobility factor can permit the subscriber station to reduce the rate and/or bandwidth of power, timing, and frequency adjustments.

A subscriber station typically implements closed loop control of each of power, timing, and frequency. The signals transmitted by the subscriber station are processed at the serving base station, and the base station provides a feedback signal for each control loop. The subscriber station and base station can use knowledge of the mobility factor to adjust the rate that feedback signals are generated and communicated to the subscriber station.

For example, the subscriber station can communicate the mobility factor to the serving base station, and the base station can adjust an update timing associated with power, timing, or frequency correction information. In addition, the subscriber station can vary a granularity in the power, timing, or frequency corrections based on the mobility factor. For lower mobility factors, the subscriber station can implement a finer adjustment granularity of step size or a reduced loop bandwidth to increase the accuracy of the signal arriving at the base station and the orthogonality between users. In one embodiment, the base station can use the mobility factor to assign a new resource to a highly mobile subscriber station over which the subscriber station can communicate power, time and frequency information.

The subscriber station can use the mobility factor in managing a sleep mode. It can be advantageous to reduce a level of power consumption in the subscriber station, because the subscriber station is typically battery powered. Reducing average power consumption can be achieved by transitioning the subscriber station to a sleep or idle mode. In sleep mode, the subscriber station does not actively monitor the communication link. Instead, the subscriber station typically awakens periodically to determine if any information is being transmitted to it or to determine if it has entered a handoff condition. The subscriber station can utilize the mobility factor to assist in determining a sleep period, selecting an appropriate sleep mode or determining the timing related to awakening from sleep mode. Low mobility factor translates to a reduced need for frequent wake-ups that are required to keep synchronization (for example, power, time and frequency synchronization) with the base station. In one embodiment, the subscriber station can store a table relating sleep and idle parameters and modes to mobility factors.

It can be advantageous to maximize the length of sleep time in order to minimize average power consumption. However, the longer sleep times increase the probability of missed communications. Additionally, the longer sleep times allow an accumulation in errors due to changes in operating conditions. For example, the power, timing, and frequency of a subscriber station is typically corrected in a closed feedback loop with the base station. An extended sleep period does not allow the subscriber station to update the various control loops. The subscriber station mobility factor increases the level of error that may accumulate. Higher mobility typically corresponds to a greater rate of change.

The subscriber station can control the sleep timer such that the subscriber station awakes just in time to decode information in an assigned time slot or overhead channel. The subscriber station typically awakens a predetermined acquisition time prior to the assigned time in order to resynchronize with the base station. The subscriber station can use the mobility factor to determine the acquisition time. For example, the subscriber station can be configured to awaken one or two frames prior to the occurrence of the assigned or desired slot or overhead channel for a low mobility factor. The subscriber station can adjust the acquisition time upward for higher mobility factors. For example, the subscriber station may awaken ten frames prior to the occurrence of the assigned or desired slot or overhead channel for a high mobility factor. The subscriber station can include a list or look up table of acquisition times corresponding to the mobility factors.

The subscriber station can also be configured to adjust one or more parameters relating to channel estimation. The subscriber station estimates the wireless channel in order to optimize its ability to recover the underlying information. In an OFDM system, the subscriber station can estimate the channel at one or more subcarriers based in part on pilot channels within the OFDM symbols. Under low mobility conditions, the subscriber station can extend an observation time to achieve an improved channel estimate. As before, the subscriber station can include a list or look up table of observation times corresponding to the mobility factors. In another embodiment, the subscriber station performs channel estimation more frequently when the subscriber station is in a high mobility state. Thus, the mobility factor can be used to affect a time constant associated with channel estimation, the frequency at which channel estimation occurs as well as other channel estimation parameters.

The base station and subscriber station can be configured to adjust a modulation and coding set used in communications. The subscriber station can monitor its mobility factor and report it to a serving base station. The base station can utilize the mobility factor in making modulation and coding set adjustments. For example, the base station can use the mobility factor and changes in the mobility factor to make modulation and coding set adjustments without the need to measure bit error rate for a long time or as a supplement factor in determining the modulation and coding scheme.

A subscriber station that is in a high mobility state will typically experience abrupt changes in the multipath characteristics of the wireless channel between it and the base station. For example, the time of arrival of the strongest and the shortest path(s) will change quite rapidly. Especially in an urban corridor, a subscriber station in a high mobility state may emerge from the shadow of a row of skyscrapers and enter an open traffic intersection, thus suddenly seeing a strong new signal from the base station. Likewise, the same subscriber station may turn a corner at the next intersection and suddenly only see a weak reflected path from the base station with which it is communicating. In order to deal with these rapid changes, when the subscriber station enters a high mobility state, the bandwidth of the time tracking loop may be increased making the loop more responsive to abrupt changes in the channel characteristics. However the penalty for an increased time tracking loop bandwidth is greater noise. Thus, when the subscriber station enters a lower mobility state, it may be advantageous to lower the bandwidth of the time tracking loop in order to reduce the noise. In this way, the mobility factor is used to adjust a time tracking parameter, thus improving the subscriber station performance.

In the same manner that the subscriber station experiences abrupt changes in the receive channel when it is in a high mobile state, the base station also experiences abrupt changes in the signal it receives from the subscriber station when the subscriber station is in a highly mobile state. The base station controls the power transmitted by the subscriber station via a subscriber station transmit power control loop. When the subscriber station enters a high mobility state, it is advantageous to increase the bandwidth of the subscriber station transmit power control loop so that the loop can react more quickly to abrupt changes in the channel. When the subscriber station enters a low mobility state, it is advantageous to lower the bandwidth of the subscriber station transmit power control loop to eliminate noise and reduce the transmission of overhead signaling over the wireless link. In this way, the mobility factor is used to adjust a transmit power control loop parameter, thus improving the subscriber station performance.

Other network entities in addition to base stations and subscriber stations may use the mobility factor to make decisions and control operating parameters. These other entities may receive the mobility factor information from a subscriber station or base station or both. These entities may collect mobility information from multiple base stations and subscriber stations and, thus, have a more comprehensive view of the conditions of the overall network. These entities may also have access to other network-wide information not collected locally by the base stations and subscriber stations and thus use the mobility factor in conjunction with other system information to make decisions and control network operating parameters. For instance, an Access Service Network-Gateway (ASN-GW) may collect and use the mobility factor information. In another embodiment, a network-based server might be deployed specifically for these purposes. In yet another embodiment, these functions might be deployed as part of an element management system or network management system.

Mobility factor determination is illustrated herein in a traditional network environment. The same principles can be applied to less traditional networks such as ad-hoc networks, mesh networks and the like. In some systems, the base station may be mobile, such as mounted on a train or plane for use by commuters or mounted on a helicopter for use by soldiers. The same principles can be applied to these cases. In general, the mobility factor measures relative motion between the subscriber station and the wireless network entry point.

In an OFDM wireless communication system, the base station communicates information to a subscriber station in a two-dimensional data allocation made up of time and frequency subcarriers. Likewise, the subscriber stations communicate information to a base station in a two-dimensional data allocation made up of time and frequency subcarriers. The base station allocates both the downlink and uplink resources to the subscriber station in two dimensions over a symbol. Within a symbol, the base station may allocate to a particular subscriber station connection either a group of subcarriers that are clustered close to one another within a symbol or subcarriers that are spread throughout the symbol. This allocation mechanism is referred to as the subcarrier permutation scheme. The 802.16e standard defines several subcarrier permutation schemes. For example, adaptive modulation and coding (AMC) is used to allocate clustered subcarriers. Full use of subcarriers (FUSC) or partial use of subcarriers (PUSC) is used to spread the subcarriers associated with a single allocation throughout the symbol.

If the base station has a good estimate of the channel and the channel is not changing rapidly, it can be more advantageous to use a subcarrier permutation scheme that clusters the subcarrier allocation in a portion of the frequency spectrum in which the channel is strong. If the base station does not have a good estimate of the channel and if the channel is changing rapidly, it can be advantageous to use a subcarrier permutation scheme that spreads the subcarriers associated with a single allocation throughout the symbol or group of symbols to take advantage of the associated time and frequency diversity gains.

The mobility of the subscriber station affects the ability to accurately estimate the channel and the speed at which the channel changes. The channel changes quickly and is harder to estimate as the speed of the subscriber station increases. Therefore, the mobility factor can be used to determine the quality of a channel estimation and, thus, in turn, determine the appropriate subcarrier permutation scheme.

Apparatus and methods for determining a mobility factor and modifying one or more apparatus operating parameters based in part on the mobility factor are described herein. An apparatus can determine a mobility factor based on one or more mobility metrics. The mobility factor may also be based on one or more apparatus states.

Where multiple mobility metrics are used, the apparatus may combine the multiple mobility metrics to generate a composite mobility metric. The apparatus can generate the composite mobility metric as a weighted sum of the mobility metrics.

The apparatus can further process the composite mobility metric. For example, the apparatus can quantize the composite mobility metric to one of a predetermined number of discrete values.

The apparatus can determine one or more apparatus states and can determine a mobility factor based on the quantized mobility metric and the one or more apparatus states. For example, the apparatus can be configured to select one of the quantized mobility metric or a predetermined value as the mobility factor based on the one or more apparatus states.

The apparatus can modify, adjust, or update one or more operating parameters based on the mobility factor. The apparatus can modify the operating parameter directly, or can modify the operating parameter indirectly. As an example, a subscriber station can communicate the mobility factor to a base station, and the base station can modify an operating parameter that affects the subscriber station. For example, the base station can modify a modulation rate, feedback loop reporting rate, and the like.

The apparatus and methods for determining and utilizing a mobility factor enable a device to optimize operating parameters in a wireless environment. The apparatus can optimize the operating parameters over a wide range of mobility factors, enabling dynamic device optimization.

Figure 9:
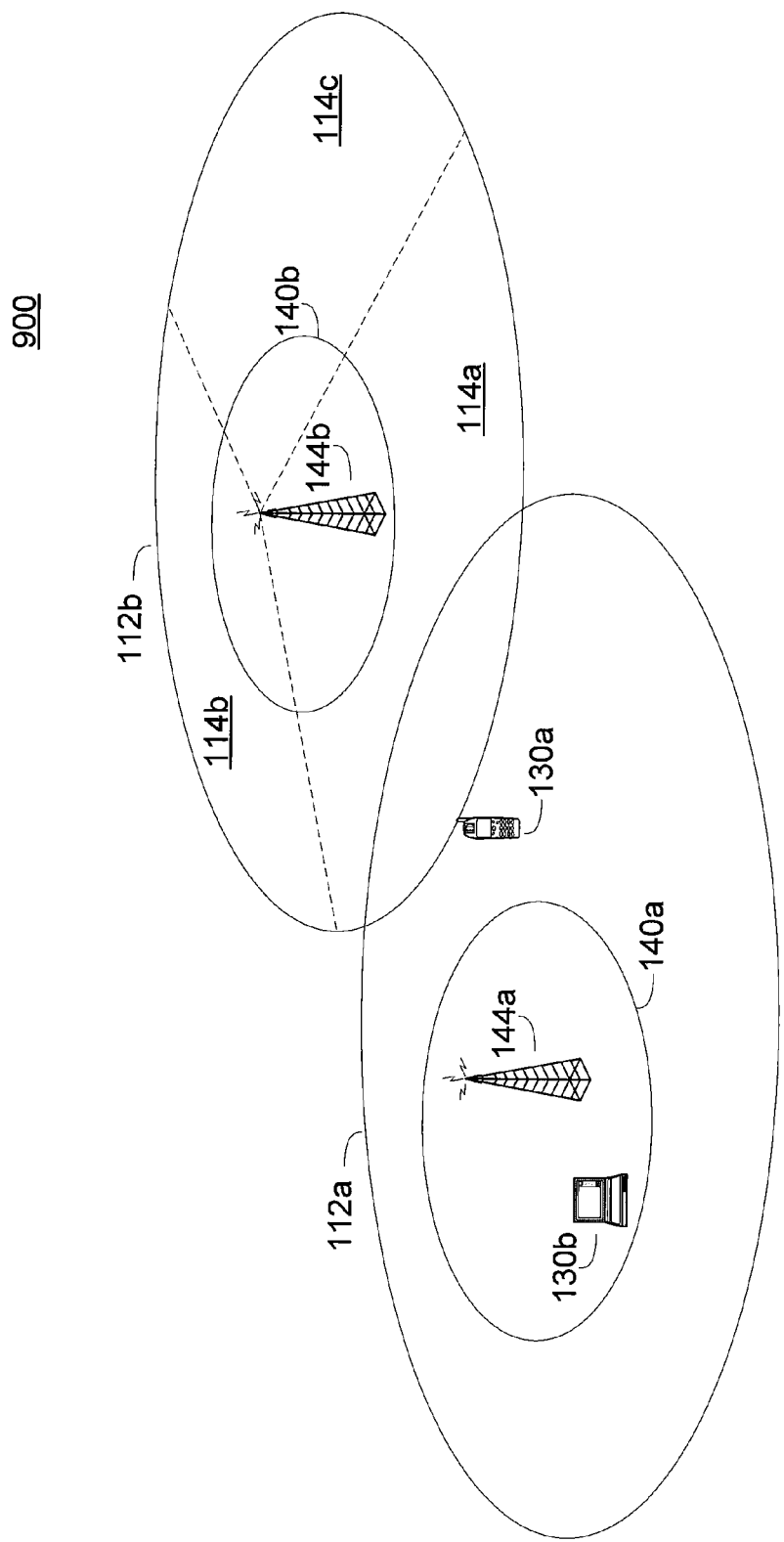
FIG. 9 is a simplified functional block diagram of an embodiment of a wireless communication system which offers both licensed service and license exempt service.

The mobility factor can be used to influence handoff between systems, base stations or service offerings. For example, FIG. 9 is a simplified functional block diagram of an embodiment of a wireless communication system which offers both an original service type and an alternative communication service type. For example, in FIG. 9, we assume the original service is licensed service occupying a corresponding licensed spectrum and the alternative service type is license exempt service occupying a corresponding license exempt spectrum, although the same principles can be applied to other systems. The wireless communication system 900 includes a plurality of base stations 144a, 144b, each supporting a corresponding licensed coverage area 112a, 112b and a corresponding license exempt coverage area 140a,

140*b*. Each of the base stations 144*a*, 144*b* can be configured to support an omni-directional coverage area or a sectored coverage area on either the licensed or license exempt spectrum.

The base station 144*a*, for example, can communicate with wireless devices over either licensed spectrum or license exempt spectrum. In order to communicate over the licensed spectrum, the network operator must have the legal right to radiate power at the corresponding frequency. Such rights are typically granted by governmental agencies and are exclusive within a limited geographic region. The cost of obtaining such rights can be very high.

In contrast, anyone who obeys the associated rules may transmit over license exempt spectrum. Typically, because the intent of license exempt spectrum is that it is generally available for use by all, the rules relating to radiated power in license exempt spectrum are stringent. Although maximum radiated power and out-of-band emissions may be tightly constrained in both licensed and unlicensed spectrum, a licensed spectrum typically permits a larger maximum transmit power compared to a maximum transmit power in a license exempt spectrum. Thus, due to constraints on radiated power, if a base station offers both licensed and license exempt service, the coverage area associated with licensed service is typically much larger than the coverage area associated with license exempt service. Thus, in FIG. 9, the licensed coverage area 112*a* covers a larger region than the license exempt coverage area 140*a*. Likewise, the licensed coverage area 112*b* covers a larger region than the license exempt coverage area 140*b*

The first base station 144*a* can wirelessly offer the second subscriber station 130*b* either licensed or license exempt service because the second subscriber station is within both the licensed coverage area 112*a* and license exempt coverage area 140*a*. The first base station 144*a* can offer the first subscriber station 130*a* only the licensed service because the first subscriber station 130*a* lies within the licensed coverage area 112*a* but outside the license exempt coverage area 140*a*.

It is advantageous if the coverage areas of adjacent base stations overlap to some extent so that as a subscriber station travels from the coverage area of a first base station to the coverage area of a second base station a smooth handoff can occur. For example, as shown in FIG. 9, the coverage area 112*a* overlaps the coverage area 112*b*. Note, however, that a smooth handoff from the license exempt coverage area 140*a* to the license exempt coverage area 140*b* is not possible because the two coverage areas do not intersect.

Because the licensed spectrum is typically expensive, it may be advantageous to offload users onto the license exempt spectrum when high quality, license exempt service is available. However, it is risky to provide license exempt service to a moving subscriber station because of the likelihood that the subscriber station will move into a region in which license exempt coverage is not available and the connection will be dropped or significantly interrupted. Thus, in one embodiment, the mobility factor can be used to influence handoffs between license exempt service and licensed service.

In one embodiment, a base station determines when a subscriber station should handoff from licensed to license exempt service based on the mobility factor. The base station monitors the mobility factor of the subscriber stations that it is servicing over licensed spectrum. It may receive the mobility factor indication from the subscriber station or it may determine the mobility factor itself. For example, either the base station or the subscriber station may determine the mobility factor according to the embodiments given above or using some other method such as the use of Global Positioning System (GPS) information. If the base station determines that a subscriber station has been stationary for an extended period of time, it commands the subscriber station to scan for the availability of viable license exempt service. If available, either the base station or the subscriber station can initiate a handoff from licensed service to license exempt service.

The period of time for which the subscriber station is stationary before the base station commands it to handoff to viable license exempt service can vary from implementation to implementation. In some embodiments, time periods may be as long as 10 minutes. In this way, a subscriber station which has been set on a desk for the evening will handoff to the license exempt service but a subscriber station which is only transiently stationary while waiting for a traffic light will not handoff. In this way, the number of dropped connections or connections which experience a significant interruption of service due to handoff is reduced.

In a similar manner, it may be advantageous to briskly transition to licensed service if movement is detected. For example, if the subscriber station detects its own mobility, it can notify the base station and/or command or request a handoff shortly after the mobility factor indicates that the subscriber station is in motion. Likewise, if the base station is determining the subscriber station mobility, the base station can notify the subscriber station and/or initiate a handoff shortly after the mobility factor indicates that the subscriber station is in motion. In this way, the subscriber station uses licensed service when in motion and the number of dropped connections or connections which experience a significant interruption of service due to handoff is reduced.

Figure 10:
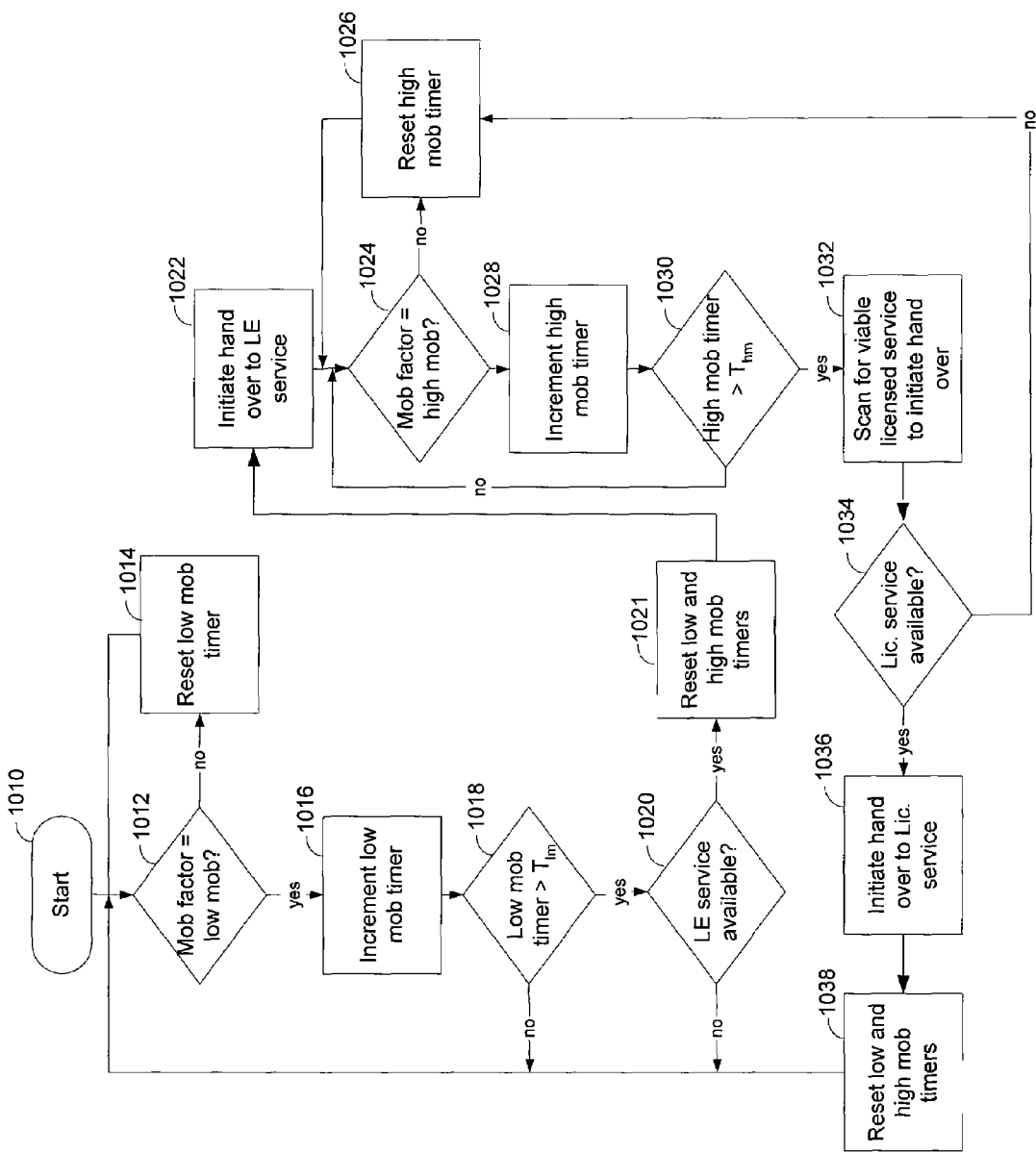
FIG. 10 is a simplified flowchart of an embodiment of a method of using a mobility factor to influence a handoff between license exempt and licensed service.

In another embodiment, the subscriber station rather than the base station may control the handoff process rather than the base station. For example, one such embodiment is shown in FIG. 10. FIG. 10 is a simplified flowchart of an embodiment of a method of using a mobility factor to influence a handoff between license exempt and licensed service, as controlled primarily by the subscriber station.

Flow starts in block 1010 when the process is initialized. We have assumed that the subscriber station is currently operating using licensed service. In block 1012, the subscriber station determines whether the mobility factor is within a low mobility range. If not, a low mobility timer is reset in block 1014 and flow continues back to block 1012. If so, the low mobility timer is incremented to reflect the passage of time in block 1016. In block 1018, the subscriber station determines whether the low mobility timer value is greater than a predetermined low mobility threshold time, $T_{lm}$. For example, as noted above, the low mobility threshold may have a relatively high value, such as measured in units of minutes. If not, the flow continues back to block 1012.

If the mobility factor has been in a low range for a time greater than the low mobility threshold time, the subscriber station determines whether viable license exempt service is available in block 1020. For example, the subscriber station may inform the base station that it is going to scan for neighboring base stations and then scan for service within a group of neighboring base stations which have been identified as offering license exempt service.

In one embodiment, the subscriber station sends the base station a scan request message. In response, the base station determines a set of scanning intervals during which it halts communication with the subscriber station. The base station communicates this information to the subscriber station in a scan response message. During the scanning intervals, the subscriber station scans the availability of the second service type.

If the subscriber station is in a sleep mode, it may scan for the availability of the second service type during the periods in which the base station assumes that the subscriber station is sleeping. In such a case, the subscriber station may not need to send a message to the base station indicating that it is entering a scanning mode.

Returning to FIG. 10, if no viable license exempt service is available, flow returns from block 1020 to block 1012. It may be advantageous to reset the low mobility timer to its initial value or some lower or higher value to avoid repeated scanning. If license exempt service is available, flow passes to block 1021 in which the low and the high mobility timers are reset. Flow then passes to block 1022 in which the subscriber station initiates handoff according to well known methods. For example, the subscriber station may send the base station a scan report message. The base station uses the scan report message to identify a target second service type base station and to coordinate the handoff. Once coordinated, the base station commands the subscriber station to handoff.

In this case, we have assumed that the handoff was successful and the subscriber station is now connected to the base station using license exempt service. In block 1024, the subscriber station determines whether the mobility factor is within the high mobility range. If not, a high mobility timer is reset in block 1026 and flow continues back to block 1024. If high mobility is active, a high mobility timer is incremented to reflect the passage of time in block 1028. In block 1030, the subscriber station determines whether the high mobility timer value is greater than a predetermined high mobility threshold time, $T_{hm}$. For example, as noted above, the high mobility threshold may have a relatively low value, such as measured in units of milliseconds. If not, the flow continues back to block 1024.

If the mobility factor has been high mobility or otherwise out of the low range for a time greater than the high mobility threshold time, the subscriber station determines whether viable licensed service is available. For example, the subscriber station may inform the base station that it is going to scan for neighboring base stations and then proceed to block 1032 and scan for service within a group of neighboring base stations which have been identified as offering licensed service. The subscriber station proceeds to block 1034 to examine the scan results and determine whether licensed service is available. Typically such service will be available and in block 1036 the subscriber station initiates a handoff to licensed service. After handoff to licensed service, the subscriber station proceeds to block 1038, where the subscriber station resets the low and high mobility timers to their initial values and flow continues in block 1012.

If the subscriber station determines at block 1034 that licensed service is not available, the subscriber station proceeds back to block 1026, where it resets the high mobility timer and continues processing in the licensed exempt service. Alternatively, the subscriber station may transition directly back to block 1024 to redetermine the mobility factor without first resetting the high mobility timer.

In one embodiment, the subscriber station may scan for the availability of alternate service type before the low mobility timer value is greater than a predetermined low mobility threshold time, $T_{lm}$ In this way, upon receipt of a handoff indication, the scanning process can either be eliminated or abbreviated and the handoff can occur without the full delay associated with the scanning process.

In another embodiment, the low mobility threshold time and the high mobility threshold time are dependent variables. For example, if the subscriber station hands over to the alternate service type and shortly thereafter transitions back to the original service type due to entering a high mobility state, it may be advantageous to increase the value of the low mobility threshold to decrease the probability of a series of handoffs. In this way, the value of the low mobility threshold time is dependent on the amount of time that the subscriber station was serviced by the alternate service type, was in a low mobility state or both.

Likewise, if the subscriber station hands off from the alternative service type back to the original service type and then remains in the original service type for a time approximately equal to the low mobility threshold time, it may be advantageous to assume that the subscriber station is primarily stationary. Thus, it may be advantageous to increase the value of the high mobility threshold time to decrease the probability of a series of handoffs. In this way, the value of the high mobility threshold time is dependent upon the amount of time that the subscriber station was serviced by the original service type, was in the high mobility state or both.

In the example above, the licensed service and license exempt service is offered by a single base station. The same principles can be applied to situations in which the licensed service and license exempt service are offered by two or more base stations having overlapping coverage areas but that are not necessarily collocated.

Figure 11:
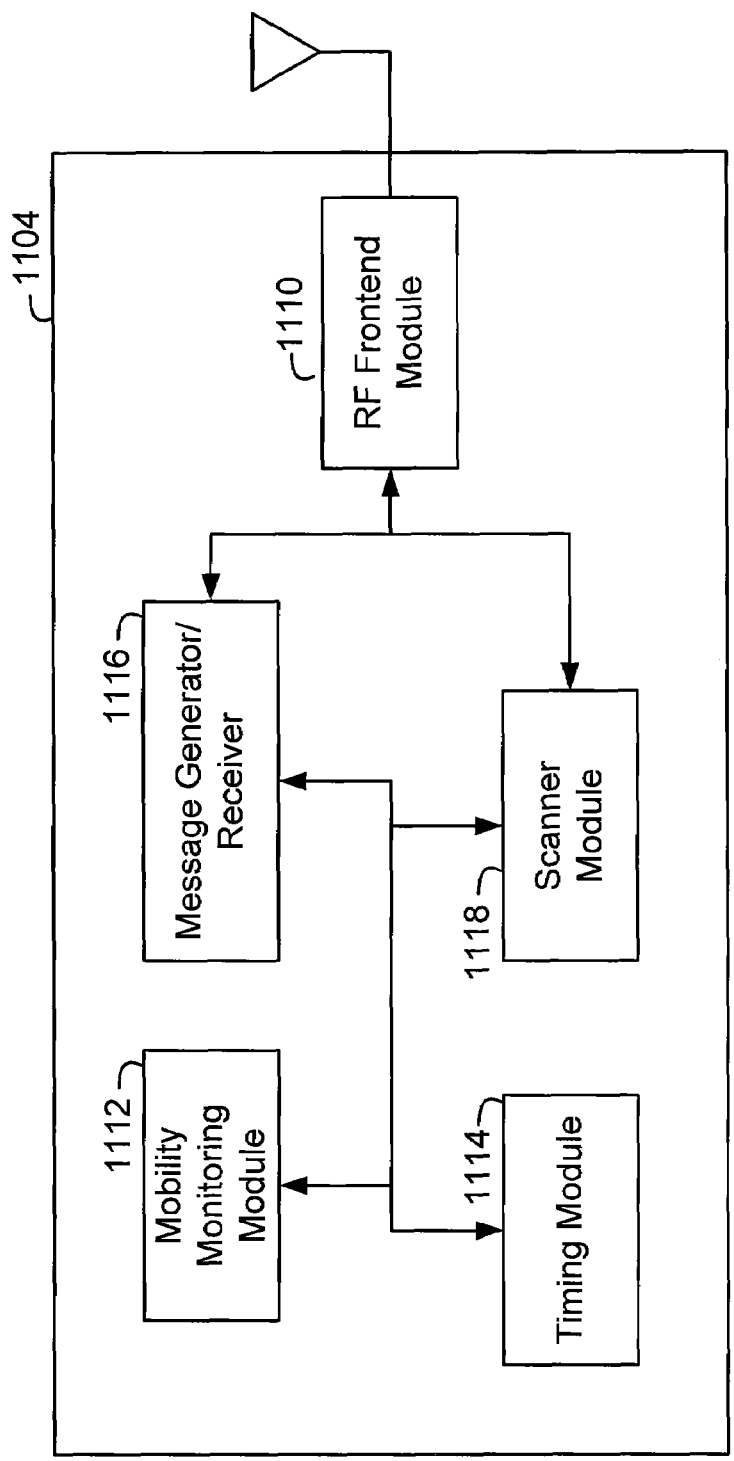
FIG. 11 is a simplified functional block diagram of one embodiment of a wireless communication system including a subscriber station capable of communicating over both a first and second service type.

FIG. 11 is a simplified functional block diagram of one embodiment of a subscriber station 1104 capable of communicating over both a first and second service type and which supports mobility influenced handoff.

The subscriber station 1104 includes a RF front end module 1110 capable of receiving and transmitting over the first and second service type. The RF front end module is directly and indirectly coupled to several logical modules. A mobility monitoring module 1112 determines the mobility factor indicative of a discrete subscriber station mobility state. In one embodiment, the mobility monitoring module 1112 determines the mobility factor based on information received from the base station through the RF front end module 1110 and a message generator/receiver 1116. In another embodiment, the mobility monitoring module 1112 determines the mobility factor based characteristics of a signal received from the base station.

A timing module 1114 implements the timing controls associated with mobility influenced handoff. For example, the timing module 1114 may implement the timing functions illustrated above in FIG. 10. The timing module 1114 is coupled to the mobility monitoring module 1112 and receives the mobility factor from the mobility monitoring module 1112. The timing module 1114 generates a handoff initiation indication. In one embodiment, the timing module 1114 generates a handoff-to-second-service indication if the subscriber station has been in a low mobility state for an extended period of time and the timing module 1114 generates a handoff-to-the-first-service indication if the subscriber station enters a high mobility state for a limited period of time.

The handoff initiation indication output by the timing module 1114 is coupled to the message generator/receiver 1116. In one embodiment, in response to the handoff initiation indication, the message generator/receiver 1116 sends appropriate messaging to the base station. When the appropriate response is received from the base station by the message generator/receiver 1116, a scanner module 1118 uses the RF front end module 1110 to scan for the availability of the first service type or second service type, as appropriate. In some embodiments, no messaging from the base station is necessary and the scanning begins either before or after the handoff initiation indication is received. If the scanning is successful and the base station commands the subscriber station to handoff, the RF front end module 1110 tunes to the indicated second service type and a handoff occurs.

Figure 12:
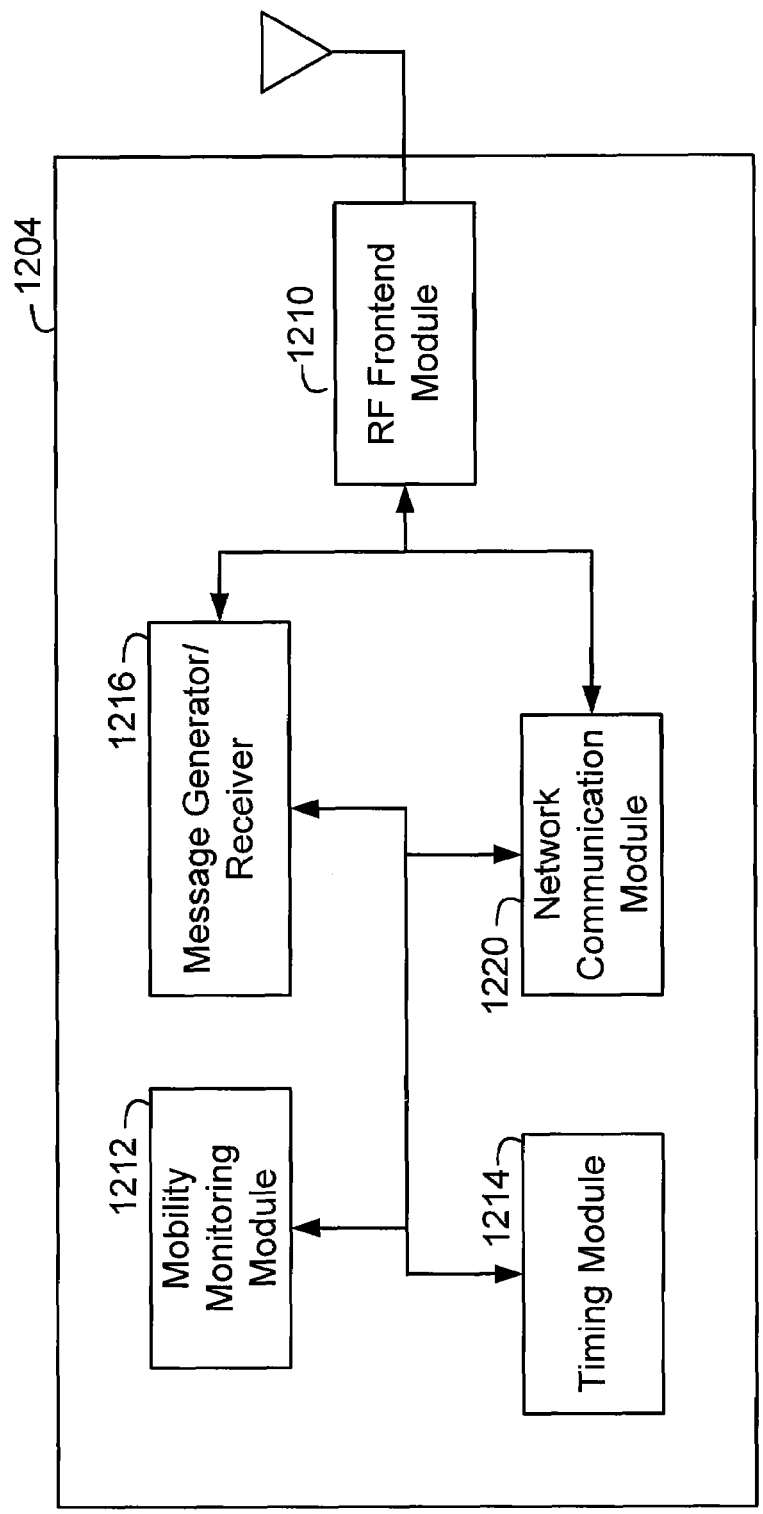
FIG. 12 is a simplified functional block diagram of one embodiment of a base station which supports mobility influenced handoff.

FIG. 12 is a simplified functional block diagram of one embodiment of a base station 1204 which supports mobility influenced handoff. The base station 1204 includes a RF front end module 1210 capable of receiving and transmitting over the first service type. In this example, we assume that the base station 1204 does not support the second service type.

The RF front end module is directly and indirectly coupled to several logical modules. A mobility monitoring module 1212 determines the mobility factor indicative of a discrete subscriber station mobility state. In one embodiment, the mobility monitoring module 1212 determines the mobility factor based on information received from the subscriber station through the RF front end module 1210 and a message generator/receiver 1216. In another embodiment, the mobility monitoring module 1212 determines the mobility factor based characteristics of a signal received from the subscriber station.

A timing module 1214 implements the timing controls associated with mobility influenced handoff. The timing module 1214 is coupled to the mobility monitoring module 1212 and receives the mobility factor from the mobility monitoring module 1212. The timing module 1214 generates a handoff initiation indication. In one embodiment, the timing module 1214 generates a handoff-to-second-service indication if the subscriber station has been in a low mobility state for an extended period of time. If the base station 1204 also offered service of the second type, the timing module 1214 would generate a handoff-to-the first-service indication if the subscriber station enters a high mobility state for a limited period of time.

The handoff initiation indication output by the timing module 1214 is coupled to the message generator/receiver 1216. In response to the handoff initiation indication, the message generator/receiver 1216 may send appropriate messaging to the subscriber station, such as, for example, a command to provide information about an availability of an alternative service type. In response, the subscriber station reports back the identity of a base station offering service of the second type to the subscriber station. The base station 1204 using the RF front end module and the message generator/receiver 1216 to receive this messaging.

In one embodiment, a network communication module 1220 contacts the base station offering service of the second type to the subscriber station and receives information therefrom with respect to a resource allocation for the subscriber station. The base station 1210 provides the appropriate information to the subscriber station and commands the subscriber station to handoff using the RF front end module and the message generator/receiver 1216.

Although in several examples above, the mobility factor influenced handoff between license exempt and licensed service, the mobility factor can be used to influence handoff in many other situations. For example, it may be advantageous to delay the handoff from a licensed service offered by a first base station to a licensed service offered by a second base station in response to a range based handoff indication received from a subscriber station that is stationary because such a handoff indication is likely to be caused by transient channel conditions. Thus, the total number of handoffs in the system can be reduced and reliability and capacity can be increased.

Even though the example above is illustrated in a system using licensed and license-exempt spectrum, these principles could be applied readily to spectrum, the use of which is authorized under a variety of regulatory schemes, including exclusive and/or non-exclusive approaches. Such approaches may include traditional exclusive license-based schemes that provide interference protection rights for primary licensees, either on a geographic and/or site-by-site basis. They may also include a variety of non-exclusive schemes, both licensed and license-exempt, which do not provide primary protection rights to any individual user but require all users to protect one another through an assortment of technical, registration and/or coordination requirements.

The mobility factor can be used to influence handoff between different types of systems. For example, in the embodiment shown in FIG. 10, the license exempt service may use the same technology as the licensed service, such as, for example, both licensed service and license exempt service may be based on IEEE 802.16 WiMAX-type service. Alternatively, the license exempt service may be based on IEEE 802.11 WiFi-type service. In addition, the mobility factor can be used to facilitate handoff to an ad-hoc or mesh network in which many subscriber stations do not communicate directly with the serving base station.

In conjunction with mobility, in one embodiment, other factors may influence hand off. For example, the time of day, the specific location of the subscriber station, the level of service assigned to the user, subscriber station device type, knowledge of expected or probable interference, service type, subscriber profile and the like may be used in conjunction with the mobility factor to control handoff.

The mobility factor can be used to influence a handoff between two systems that are operating in the same frequency band. For example, a wide area network may offer license exempt service to subscriber stations based on IEEE 802.16 WiMAX-type service. If the subscriber station is in a low mobility state and within the coverage area of a local area network offering IEEE 802.11 WiFi-type service in the same frequency band, the subscriber station may handoff to the local area network.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps and modules of a method, process, apparatus or algorithm described in connection with the embodiments disclosed herein may be embodied directly in hardware, in software executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of handoff in a wireless system having a base station that communicates with a subscriber station, the method comprising:

establishing, at the base station, a service with the subscriber station in a licensed spectrum;

determining, at the base station, a first value of a mobility factor indicative of a relative motion of the subscriber station;

transferring, at the base station, the service from the licensed spectrum to a non-licensed spectrum associated with the base station if the first value of the mobility factor indicates that the subscriber station has been in a low mobility state for at least a predetermined period of time.

2. A subscriber station comprising:
a front end module configured to establish a service with a base station in a licensed spectrum; and
a mobility monitoring module configured to:
determine a first value of a mobility factor indicative of a relative motion of the subscriber station communicating using the licensed spectrum; and
determine an availability of the service from the base station via a non-licensed spectrum; and
wherein the front end module is further configured to initiate transfer of the service to the non-licensed spectrum associated with the base station if the first value of the mobility factor indicates that the subscriber station has been in a low mobility state for at least a predetermined period of time.

3. The method of claim 1, further comprising: receiving, at the base station, the first value of the mobility factor from the subscriber station.

4. The method of claim 1, wherein at least one value of the mobility factor is based, at least in part, on correlating pilot signals of at least two distinct Orthogonal Frequency Division Multiplex (OFDM) symbols separated by a time offset.

5. The method of claim 1, wherein at least one value of the mobility factor is based, at least in part, on a change in a frequency offset relative to a desired receive frequency over a time period by determining a product of symbol samples from an Orthogonal Frequency Division Multiplex (OFDM) symbol with corresponding samples from a cyclic prefix from the OFDM symbol.

6. The method of claim 1, wherein at least one value of the mobility factor is based, at least in part, on a change in an average power of received Orthogonal Frequency Division Multiplex (OFDM) symbols.

7. The method of claim 1, wherein at least one value of the mobility factor is a composite mobility factor based, at least in part, on a quantized combination of a plurality of distinct mobility factors.

8. The method of claim 1, wherein at least one value of the mobility factor indicates one of a limited number of discrete mobility states.

9. The method of claim 1, wherein at least one value of the mobility factor is based, at least in part, on a wireless signal received by the subscriber station.

10. The method of claim 9, further comprising:
determining an operating state based at least in part on information carried on the wireless signal,
wherein at least one mobility factor is based, at least in part, on the operating state.

11. The subscriber station of claim 2, wherein the front end module is further configured to transmit a scan request message to the base station to determine the availability of the service via non-licensed spectrum.

12. The subscriber station of claim 2, wherein the mobility monitoring module is further configured to determine a second value of the mobility factor indicative of relative motion of the subscriber station communicating using the non-licensed spectrum, and wherein the front end module is further configured to initiate transfer of the service to the licensed spectrum associated with the base station if the second value of the mobility factor indicates that the subscriber station has been in a high mobility state for at least a second predetermined period of time.

13. A subscriber station comprising:
a front end module configured to establish a service with a base station via a non-licensed spectrum;
a mobility monitoring module configured to:
determine a first value of a mobility factor indicative of a relative motion of the subscriber station communicating using the non-licensed spectrum; and
determine an availability of the service from the base station via a licensed spectrum; and
wherein the front end module is further configured to initiate transfer of the service to the licensed spectrum associated with the base station if the first value of the mobility factor indicates that the subscriber station has been in a high mobility state for at least a predetermined period of time.

14. The subscriber station of claim 13, wherein the mobility monitoring module is further configured to determine a second value of the mobility factor indicative of relative motion of the subscriber station communicating using the licensed spectrum, and wherein the front end module is further configured to initiate transfer of the service to the non-licensed spectrum associated with the base station if the second value of the mobility factor indicates that the subscriber station has been in a low mobility state for at least a second predetermined period of time.

15. The subscriber station of claim 13, wherein the front end module is further configured to transmit a scan request message to the base station to determine the availability of the service via licensed spectrum.

16. A method of handoff in a wireless system having a base station that communicates with a subscriber station, the method comprising:
establishing, at the base station, a service with the subscriber station in a non-licensed spectrum;
determining, at the base station, a first value of a mobility factor indicative of a relative motion of the subscriber station;
transferring, at the base station, the service from the non-licensed spectrum to a licensed spectrum associated with the base station if the first value of the mobility factor indicates that the subscriber station has been in a high mobility state for at least a predetermined period of time.

17. The method of claim 15, further comprising:
determining, at the base station, a second value of the mobility factor inidicative of the relative motion of the subscriber station; and
transferring, at the base station, the service from the licensed spectrum to the non-licensed spectrum associated with the base station if the second value of the mobility factor indicates that the subscriber station has been in a low mobility state for at least a second predetermined period of time.

18. The method of claim 1, further comprising:
determining, at the base station, a second value of the mobility factor inidicative of the relative motion of the subscriber station; and
transferring, at the base station, the service from the non-licensed spectrum to the licensed spectrum associated with the base station if the second value of the mobility factor indicates that the subscriber station has been in a high mobility state for at least a second predetermined period of time.

\* \* \* \* \*